United States Patent
Kunisa

(10) Patent No.: US 7,336,802 B2
(45) Date of Patent: Feb. 26, 2008

(54) DIGITAL WATERMARKING SYSTEM USING SCRAMBLING METHOD

(75) Inventor: Akiomi Kunisa, Tokyo (JP)

(73) Assignee: Sanyo Electric Co., Ltd., Osaka (JP)

( * ) Notice: Subject to any disclaimer, the term of this patent is extended or adjusted under 35 U.S.C. 154(b) by 215 days.

(21) Appl. No.: 11/222,776

(22) Filed: Sep. 12, 2005

(65) Prior Publication Data
US 2006/0056653 A1    Mar. 16, 2006

(30) Foreign Application Priority Data
Sep. 16, 2004    (JP) ............................. 2004-270490

(51) Int. Cl.
*G06K 9/00* (2006.01)
*H04L 9/00* (2006.01)
(52) U.S. Cl. .................. 382/100; 713/176; 380/46
(58) Field of Classification Search ................ 382/100; 713/176; 380/46
See application file for complete search history.

(56) References Cited

U.S. PATENT DOCUMENTS

| | | | |
|---|---|---|---|
| 6,252,972 B1 * | 6/2001 | Linnartz ..................... | 382/100 |
| 6,557,103 B1 * | 4/2003 | Boncelet et al. ............ | 713/176 |
| 6,704,431 B1 * | 3/2004 | Ogawa et al. ............... | 382/100 |
| 6,768,807 B1 * | 7/2004 | Muratani .................... | 382/100 |
| 6,768,809 B2 * | 7/2004 | Rhoads et al. .............. | 382/100 |
| 6,839,450 B2 * | 1/2005 | Yen et al. ................... | 382/100 |
| 7,013,023 B2 * | 3/2006 | Ehrmann Patin et al. ... | 382/100 |
| 7,127,065 B1 * | 10/2006 | Depovere et al. ........... | 380/201 |
| 2003/0152225 A1 * | 8/2003 | Kunisa ....................... | 380/210 |
| 2004/0042636 A1 * | 3/2004 | Oh ............................. | 382/100 |
| 2004/0073916 A1 * | 4/2004 | Petrovic et al. .............. | 725/18 |
| 2004/0101160 A1 * | 5/2004 | Kunisa ....................... | 382/100 |
| 2005/0137876 A1 * | 6/2005 | Lee et al. ................... | 704/273 |
| 2006/0083403 A1 * | 4/2006 | Zhang et al. ............... | 382/100 |

FOREIGN PATENT DOCUMENTS

JP    2003-244419    8/2003

* cited by examiner

*Primary Examiner*—Andrew W. Johns
*Assistant Examiner*—Anthony Mackowey
(74) *Attorney, Agent, or Firm*—McDermott Will & Emery LLP

(57) ABSTRACT

A digital watermark extracting apparatus that extract a watermark hidden in host data is provided. A location information generator generates a plurality of candidate watermark locations according to a secret key. An extractor extracts from each of the candidate watermark locations a watermark which has been embedded in a watermarked host signal and detects a soft decision value on the extracted watermark. A decision value evaluator evaluates a sum of the absolute values of the components of the each soft value. A selector determines a true watermark location according to the soft decision value evaluated by the decision value evaluator. The selector provides to an ECC decoder the soft decision value on the watermark extracted from the true watermark location. The ECC decoder error-correction decodes the soft decision value on the extracted watermark and outputs watermark information.

3 Claims, 15 Drawing Sheets

FIG.3

| IDENTIFICATION NUMBER | FIRST BIT | SECOND BIT | ... | n-TH BIT |
|---|---|---|---|---|
| 0 | (1, 29) | (314, 252) | ... | (96, 718) |
| 1 | (983, 251) | (30, 563) | ... | ... |
| ⋮ | ⋮ | ⋮ | ⋮ | ⋮ |
| 15 | (542, 37) | ... | ... | ... |

DIGITAL WATERMARKING SYSTEM USING SCRAMBLING METHOD

BACKGROUND OF THE INVENTION

1. Field of the Invention

The present invention relates to a digital watermarking technology, and it particularly relates to an apparatus and method for embedding a digital watermark and an apparatus and method for extracting a digital watermark.

2. Description of the Related Art

The number of Internet users has rapidly increased in recent years and we are now entering the age of the broadband, or a new stage in the utilization of the Internet. Since communication bandwidth has greatly expanded in broadband communication, the distribution of items containing large bodies of data such as audio, still image, and video can be enjoyed with ease. When the distribution of such digital items becomes popular, a highly efficient method of protecting the copyright of their contents will be required.

In the present situation, the copyright is not protected well so that users can easily copy such contents distributed via the Internet. Therefore, technology for embedding information on the originator of the content and the user into the content as a digital watermark has been developed. By using this watermarking technology, it becomes possible to extract the digital watermark from the content distributed via the network, and thereby detect an illegal use and track the distribution route of an illegal copy.

In the reference [1], the applicant has proposed a digital watermarking technology which can detect a location in which a given watermark is to be stickily embedded and can improve the robustness of the watermark embedded in the location.

A digital watermark is embedded in the content data in a way that the watermark is perceptually invisible to users in order to prevent malicious attacks. However, the content data will be subject to various operations during the distribution and utilization, for instance, signal processing such as compression, various types of filtering, modification by users, or attacks on the watermark information. In such processes, a part of the digital watermark may be possibly altered or removed. Therefore the digital watermark should be robust enough to withstand such operations.

In the digital watermark extraction method of the reference [1], there are a plurality of candidate locations in which a digital watermark is to have been embedded. A correct watermark position is determined using an anticipated watermark and the anticipated watermark is detected at the determined watermark position. This watermark extraction method needs to be improved so as to be applied for a case in which there is no available anticipated watermark. Moreover, there is a room for further improvement on a computational cost for evaluating robustness of a digital watermark at the embedding side.

Related Art List:

[1] JP 2003-244419 A

SUMMARY OF THE INVENTION

The present invention has been made based on these considerations, and an object thereof is to provide a digital watermarking technology which can embed a watermark with a high degree of robustness and reduce the detection error rate of the embedded watermark. Another object thereof is to provide an advantageous technology in respect of the computational complexity in evaluating the robustness of a digital watermark. Still another object thereof is to provide a technology that can extract a digital watermark from a true watermarking location, when there are a plurality of candidate locations in which a digital watermark is supposed to have been embedded and even if no anticipated watermark is given.

According to one aspect of the present invention, a digital watermark embedding apparatus is provided. The apparatus comprises: a location information generating unit which generates a plurality of candidate locations of host data in which a digital watermark is to be embedded; an embedding unit which embeds the watermark in the respective candidate locations of the host data and generates a plurality of candidate watermarked host data; a correlation evaluating unit which evaluates robustness of the watermark embedded in the respective candidate watermarked host data according to a correlation coefficient between a true value of the actual embedded watermark and a decision value of a watermark detected from the respective candidate watermarked host data; and a selecting unit which selects and outputs one of the plurality of the candidate watermarked host data according to the evaluated robustness.

According to another aspect of the present invention, a digital watermark embedding apparatus is also provided. The apparatus comprises: a scrambling unit which scrambles a digital watermark to be embedded in host data and generates a plurality of candidate watermarks; an embedding unit which embeds the respective candidate watermarks in the host data and generates a plurality of candidate watermarked host data; a correlation evaluating unit which evaluates robustness of the watermark embedded in the respective candidate watermarked host data according to a correlation coefficient between a true value of the actual embedded watermark and a decision value of a watermark detected from the respective candidate watermarked host data; and a selecting unit which selects and outputs one of the plurality of the candidate watermarked host data according to the evaluated robustness.

The host data are original data in which the digital watermark is to be embedded, for instance, data such as still image, video, audio or the like. The digital watermark to be embedded includes identification information, originator information, user information on the original data, and so on. Furthermore, a digest on the host data, that is data plainly representing the characteristics of the host data, can be embedded as the digital watermark.

The robustness of the digital watermark means to what extent the digital watermark can survive any kinds of operations against the watermarked host data, for instance, signal processing such as compression or filtering.

The correlation evaluating unit may evaluate the robustness of the watermark embedded in the respective candidate watermarked host data according to a correlation coefficient between a true value of the actual embedded watermark and a soft decision value of a watermark detected by a soft decision from the respective candidate watermarked host data. If the true value of the watermark is binary, that is −1 or 1, the correlation coefficient can be simply calculated by a summation of the soft decision values.

The correlation evaluating unit may evaluate the robustness of the watermark detected from the respective candidate watermarked host data on which a utility operation has been conducted beforehand. The utility operation is, for instance, signal processing such as compression, various filtering or the like, and geometric transformation such as scaling, rotation or the like. The correlation evaluating unit may evaluate the robustness of the watermark detected from the respective candidate watermarked host data on which a quantization operation in compression-encoding the watermarked host data has been conducted beforehand.

According to still another aspect of the present invention, a digital watermark extracting apparatus is provided. The apparatus comprises: a location information generating unit which generates a plurality of candidate locations of host data in which a digital watermark is supposed to have been embedded; an extracting unit which extracts a plurality of candidate watermarks embedded in the host data according to the respective candidate locations; a decision value evaluating unit which evaluates significance of a decision value on each of the plurality of the extracted candidate watermarks; and a selecting unit which determines that one of the plurality of the candidate locations is a true watermark location according to an evaluation result of the significance of the decision value, and selects and outputs a watermark extracted from the true watermark location.

The significance of the decision value implies that the decision value is related with any significance value particularly in respect of estimating reliability of the extracted watermark.

The decision value evaluating unit may evaluate the significance according to a soft decision value on each bit of the respective extracted candidate watermarks, and the selecting unit may determine that one candidate location which is evaluated to be most significant according to the soft decision value is the true watermark location. By using a soft decision value, the accuracy of evaluating the significance of the decision value on the watermark is increased and therefore the accuracy of determining the true watermark location can be improved. Furthermore, by using a soft decision value, the detection accuracy of each bit of the watermark can be improved.

The selecting unit may determine that there is no watermark embedded in any candidate locations, if the evaluated significance does not have any difference larger than a predefined threshold between one candidate location which is evaluated to be most significant and another candidate location which is evaluated to be next most significant. By this configuration, only when the evaluated significance has a difference equal to or larger than a predefined threshold between one candidate location which is evaluated to be most significant and another candidate location which is evaluated to be next most significant, the true watermark location is determined and the watermark is extracted so that the false detection of the watermark can be prevented.

According to still another aspect of the present invention, a digital watermark embedding method is provided. The method comprises generating a plurality of candidate locations of host data in which a digital watermark is embedded, evaluating robustness of the digital watermark when the watermark is embedded in the respective candidate locations according to a correlation coefficient between a true value of the actual embedded watermark and a decision value of a watermark detected from watermarked host data, and selecting the watermarked host data in which the watermark is embedded with a high level of robustness.

According to still another aspect of the present invention, a digital watermark embedding method is also provided. The method comprises scrambling a digital watermark to be embedded in host data and thereby generating a plurality of candidate watermarks, and evaluating robustness of the respective candidate watermarks when the respective candidate watermarks are embedded in the host data according to a correlation coefficient between a true value of the actual embedded watermark and a decision value of a watermark detected from watermarked host data, and selecting the watermarked host data in which one of the candidate watermarks is embedded with a high level of robustness.

According to still another aspect of the present invention, a digital watermark extracting method is provided. The method comprises generating a plurality of candidate locations of host data in which a digital watermark has been embedded, evaluating significance of a decision value on a watermark extracted from the respective candidate locations, determining that one of the plurality of the candidate locations is a true watermark location according to an evaluation result of the significance of the decision value, and selecting a watermark extracted from the true watermark location.

Moreover, any arbitrary replacement or substitution of the above-described structural components and the steps, expressions replaced or substituted in part or whole between a method and an apparatus as well as addition thereof, and expressions changed to a system, a computer program, a data structure, a storage medium, a transmission medium or the like are all effective as and are encompassed by the present invention.

This summary of the invention does not necessarily describe all necessary features, so that the invention may also be a sub-combination of these described features.

BRIEF DESCRIPTION OF THE DRAWINGS

FIG. 3 illustrates a table that associates information for identifying a candidate watermark location with an actual watermark location.

DETAILED DESCRIPTION OF THE INVENTION

The invention will now be described by reference to the preferred embodiments. This does not intend to limit the scope of the present invention, but to exemplify the invention.

Embodiment 1

Figure 1:
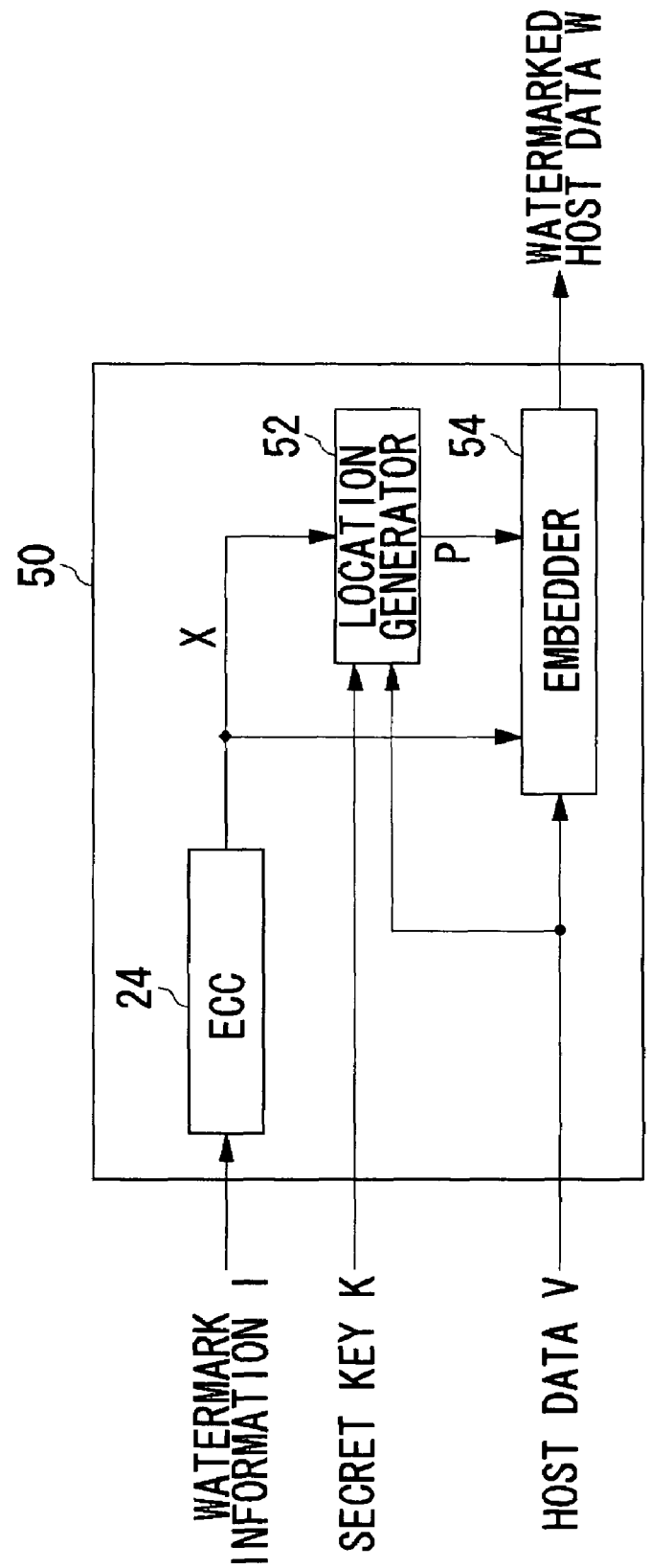
FIG. 1 shows a basic structure of a digital watermark embedding apparatus according to Embodiment 1.

FIG. 1 shows a basic structure of a digital watermark embedding apparatus 50 according to Embodiment 2. The digital watermark embedding apparatus 50 performs a process for embedding watermark information I in host data V and outputs watermarked host data W. The host data V are, for instance, media data such as audio, still image, video or the like. The watermark information I, for instance, includes copyright information such as identification, creator, or user information on the host data V, authentication information for detecting attacks on the host data V, timestamp information, and so forth. In general, the watermark information I is encrypted data of such information.

An error correction coder (ECC) 24 encodes the watermark information I to be embedded in the host data V and outputs a corrected watermark X. When the error-correction encoding function is denoted by $f_1$, this process can be represented by a transformation equation $X=f_1(I)$.

A location generator 52 determines a watermark location P of the watermark X according to the characteristics of the host data V and the secret key K. When the watermark X is embedded into the host data V, the location generator 52 searches the watermark location P for which the watermark has a high level of robustness against noise. When the watermark location determining function is denoted by $f_2$, this process employed by the location generator 52 can be represented by a transformation equation $$P=f_2(V, X, K).$$

An embedder 54 embeds the watermark X in the watermark location P of the host data V and outputs the watermarked host data W. When the embedding function is denoted by $f_3$, this process can be represented by a transformation equation $$W=f_3(V, X, P).$$

The watermark location determining function $f_2$ is realized by guided position scrambling (GPS). The GPS is a modified version of guided scrambling (GS), usually used for digital modulation for data transmission and magnetic recording. GS generates L kinds of encoded sequences from a data sequence of a definite block length, and treats the generated sequences as candidates for an encoded sequence to be transmitted next. GS selects one which is most suitable to the characteristics of the transmission medium and transmits the selected one as a final encoded sequence. Adopting the concept of this GS scheme, GPS scrambles the location of the host data V in which the watermark data X is embedded and detects a watermark location for which the watermark has the robustness, and then generates the watermarked host data W in which the watermark has been embedded at the detected location. By the GPS method, the detection rate of the watermark bits can be improved while the quality of the watermarked host data W is kept from being perceptibly degraded from that of the original host data V.

Figure 2:
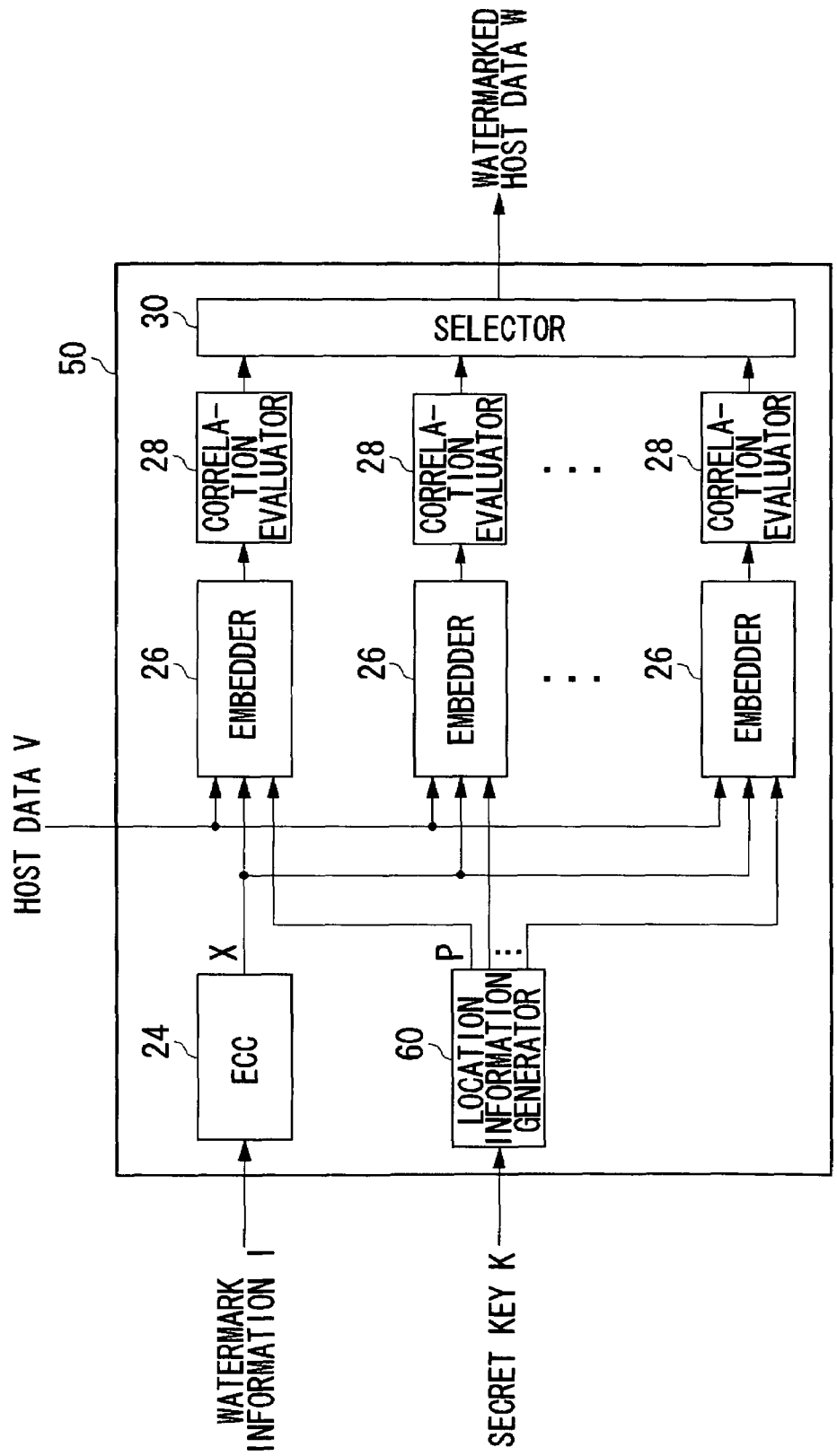
FIG. 2 is a concrete block diagram of the digital watermark embedding apparatus of FIG. 1.

FIG. 2 is a concrete block diagram of the digital watermark embedding apparatus 50. This structure can be realized by hardware, such as a CPU in arbitrary computers, memory and other LSIs, or by software, such as a program or the like loaded in the memory, which has functions for embedding a digital watermark. In the figure, functions, which are realized by combinations of such hardware and software, are shown by blocks. It should be understood by those skilled in the art that these functional blocks can be realized by various modes such as hardware only, software only or a combination thereof.

The digital watermark embedding apparatus 50 embeds the watermark X in a plurality of candidate locations of the host data V and selects one of candidates for the watermarked host data with a high level of robustness and outputs it as a final watermarked host data W.

A location information generator 60 generates L candidate watermark locations P of the host data V, according to a secret key K. The candidate watermark locations P may be randomly generated by a look-up table.

FIG. 3 illustrates a table identifying the candidate watermark locations. Referring to this table, the location information generator 60 generates the candidate watermark locations corresponding to its identification number. In other words, the table stores a correspondence relation between identification numbers and coordinates of the watermark locations, for instance, a location (1, 19) for an identification number 0, a location (983, 251) for an identification number 1, . . . , and a location (542, 37) for an identification number 15, for the first bit of the watermark. For each of the second to the n-th bits, a correspondence relation which defines different watermark locations is stored. The coordinates of the watermark locations may be randomly generated by some other method.

The ECC 24 generates the watermark X by adding the parity bits for error correction to the watermark information I and provides it to L embedders 26. The embedders 26 embed the watermark X to the respective candidate watermark locations P of the host data V and generate L kinds of candidate watermarked host data W.

L correlation evaluators 28 each evaluate the robustness of the watermark X hidden in the L kinds of candidate watermarked host data W. The evaluation of the robustness of the watermark X is done by calculating a correlation coefficient between the embedded watermark bits and the watermark data extracted from the watermarked host data W. A selector 30 selects one of the L kinds of candidate watermarked host data W for which the evaluated value of the robustness is the best, and outputs it as watermarked host data W.

In the above-mentioned embodiment, L embedders 26 and L correlation evaluators 28 are provided in parallel to generate L kinds of candidate watermarked host data W. Alternatively, a single embedder 26 and a single correlation evaluator 28 may be provided and L kinds of candidate watermarked host data W may be sequentially generated and evaluated, and thereby an optimal candidate may be selected. During the sequential generation of the candidate watermarked host data W, once a candidate with a higher level of robustness than a desired level is obtained, the candidate can be selected as the final watermarked host data W. If such a candidate is not generated, from among L kinds of candidates for the watermarked host data which are generated in the sequential computation, one candidate with the highest level of the robustness can be selected as the final watermarked host data W.

Figure 4:
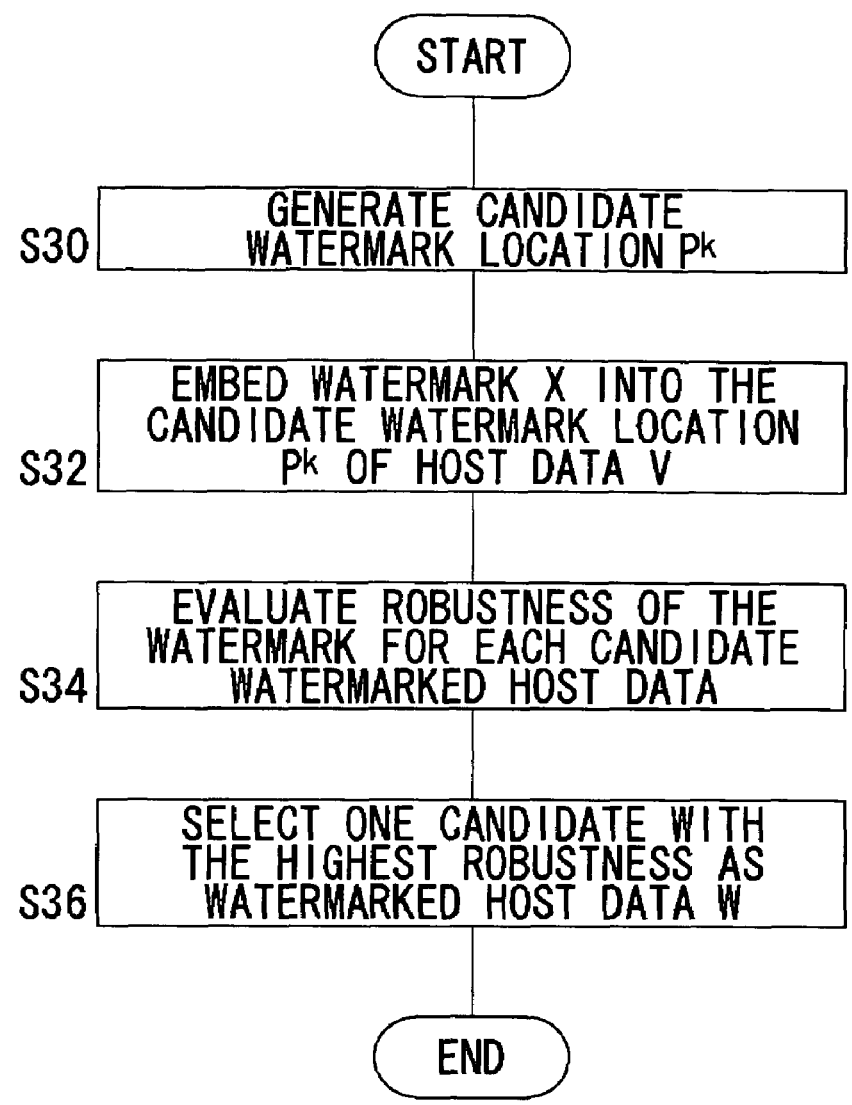
FIG. 4 is a flowchart showing a watermark embedding procedure employed by the digital watermark embedding apparatus of FIG. 2.

FIG. 4 is a flowchart showing the watermark embedding procedure employed by the digital watermark embedding apparatus 50.

The location information generator 60 generates L candidate watermark locations $P^k$ (k=0, ..., L-1) for the watermark X (S30).

The ECC 24 adds parity bits for error correction to the watermark X and the embedder 26 embeds the watermark X in each of the L candidate watermark locations $P^k$ of the host data V (S32).

The watermark X is represented by the following bit sequence of n bits:

$$X=\{x_0, x_1, \ldots, x_{n-1}\}.$$

A pair of sample sets $(V^{+k}, V^{-k})$ for embedding the watermark X of n bits is defined as follows. The samples which correspond to the candidate watermark location $P^k$ are selected from the host data V. The sample sets $V^{+k}$ and $V^{-k}$ each contain n elements. It is to be noted that the host data V are represented by a set of samples over spatial domain, temporal domain, or frequency domain, for instance, the samples processed by Discrete Cosine Transform, Discrete Fourier Transform or Discrete Wavelet Transform. The sample sets $V^{+k}$ and $V^{-k}$ consist of n subsets:

$$V^{+k}=\{v^{+k}_0, v^{+k}_1, \ldots, v^{+k}_{n-1}\}$$

$$V^{-k}=\{v^{-k}_0, v^{-k}_1, \ldots, v^{-k}_{n-1}\},$$

where each subset $v^{+k}_i$ and $v^{-k}_i$, an element of the sample sets $V^{+k}$ and $V^{-k}$, respectively, is composed of m samples of the host data V:

$$v^{+k}_i=\{v^{+k}_{i,0}, v^{+k}_{i,1}, \ldots, v^{+k}_{i,m-1}\}$$

$$v^{-k}_i=\{v^{-k}_{i,0}, v^{-k}_{i,1}, \ldots, v^{-k}_{i,m-1}\}.$$

Each bit of the watermark X is embedded into the L sample pair sets $(V^{+k}, V^{-k})$ corresponding to the candidate watermark location $P^k$ to generate L kinds of the candidate watermarked host data $W^k$ as follows:

$$w^{+k}_{i,j}=v^{+k}_{i,j}+\alpha^+_{i,j}x_i$$

$$w^{-k}_{i,j}=v^{-k}_{i,j}-\alpha^-_{i,j}x_i,$$

where $\alpha^+_{i,j}$ and $\alpha^-_{i,j}$ are positive values to scale the watermark bit $x_i$ according to a human visual system so as not to recognize the perceptual noise. This makes the candidate watermarked host data $W^k$ guaranteed to be within a non-linear region where the perceptual distortion to the host data V may not occur according to the human visual system. The valuse $\alpha^+_{i,j}$ and $\alpha_{-i,j}$ may be positive values, using the secret key K, drawn from a certain probability distribution, for instance, a Gaussian distribution, a uniform distribution or the like. In this case, the robustness of the embedded watermark is degraded. However, the confidentiality of the embedded watermark is improved.

Thus, each bit $x_i$ of the watermark is redundantly embedded into m samples in each subsets $v^{+k}_i$ and $v^{-k}_i$. As the number m indicating the degree of the redundancy becomes greater, the possibility that the watermark bits are lost becomes lower and the detection error rate becomes smaller, whereas the number of bits that can be embedded into the host data decreases. Since each sample value is changed using $\alpha^+_{i,j}$ and $\alpha^-_{i,j}$ so that visual degradation is not perceptible, in principle, the degradation of image quality will not be perceptible by human eyes even though the number m of samples in which a watermark bit is embedded increases. That is, the increase in m means the number of watermark bits which can be embedded decreases because of the limited region for watermarking, resulting in a decline in the watermark payload.

Figure 5A:
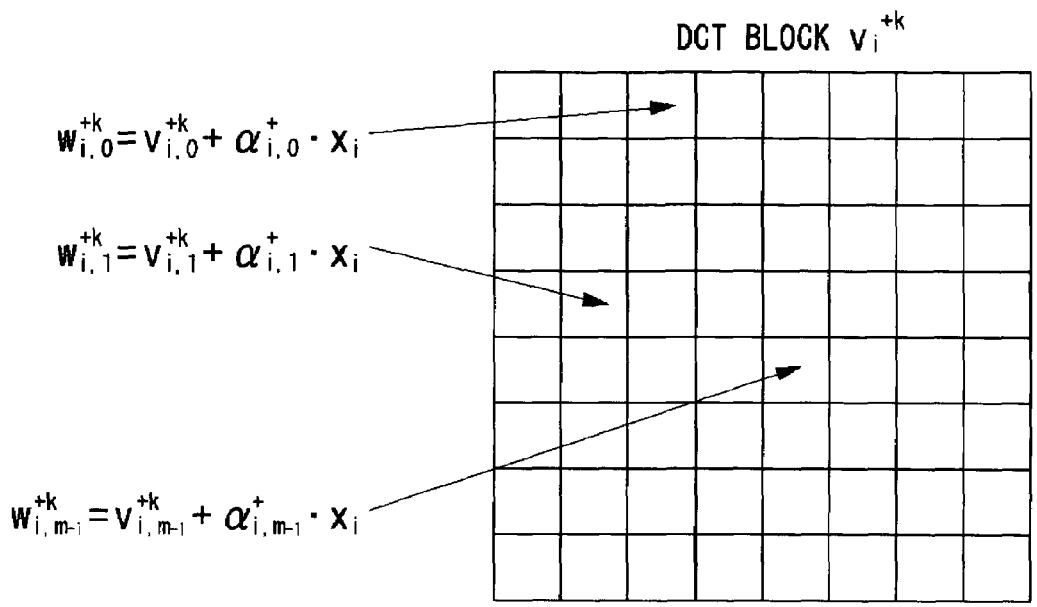
FIGS. 5A and 5B explain how a scrambled watermark is embedded.
Figure 5B:
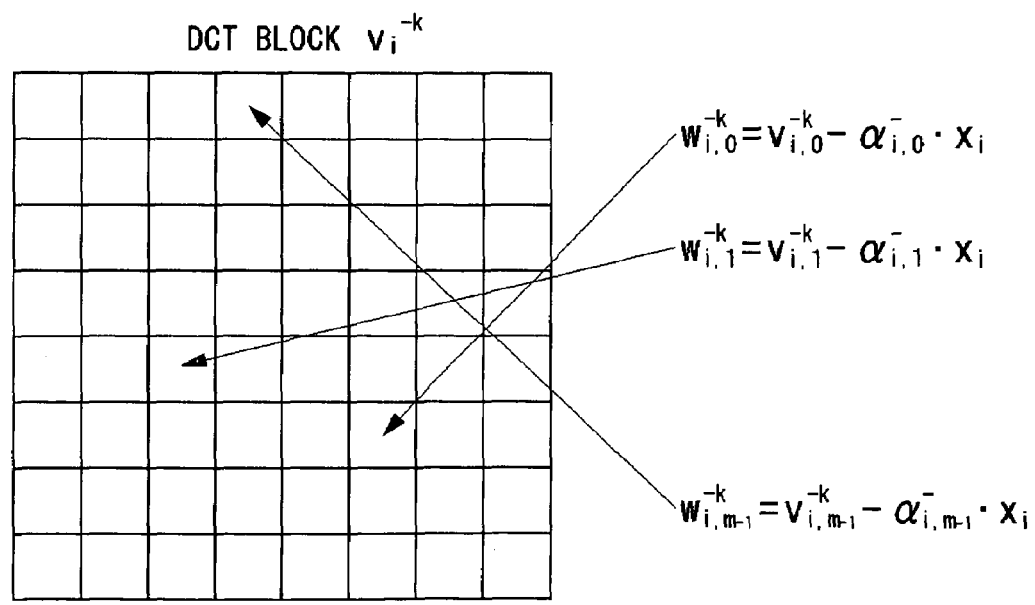

Each of the subsets $v^+_i$ and $v^-_i$ is, for example, a Discrete Cosine Transform (DCT) block into which a block of the host data V are transformed by DCT. The m samples in which the watermark bits are embedded are DCT coefficients in the DCT block. FIGS. 5A and 5B show how a watermark bit $x_i$ is embedded into the m DCT coefficients in a pair of DCT blocks $v^{+k}_i$ and $v^{-k}_i$ of 8×8 samples. The block pair $v^{+k}_i$ and $v^{-k}_i$ and the m DCT coefficients are selected on the basis of the secret key K.

The correlation evaluator 28 evaluates the robustness of the watermark X for each of the L kinds of the candidate watermarked host data $W^k$ (S34), and the selector 32 finally selects one candidate watermarked host data $W^k$ that has the highest degree of robustness as the final watermarked host data W (S36).

Before addressing a formula for evaluating its robustness, the manner in which the watermark X is to be extracted, is considered, when the watermarked host data W are transformed by signal processing, image processing or the like. The distortion caused by the transformation of the watermarked host data W is regarded as a noise N. The watermarked host data W to which the noise N is added are called a watermarked host signal W'. The method for extracting the watermark X from the watermarked host signal W' is now explained. A pair of the watermarked host signal sets $(W'^+, W'^-)$ is defined, where the sets $W'^+$ and $W'^-$ have n elements, respectively, as follows:

$$W'^+=\{w'^+_0, w'^+_1, \ldots, w'^+_{n-1}\}$$

$$W'^-=\{w'^-_0, w'^-_1, \ldots, w'^-_{n-1}\},$$

where the subsets $w'^+_i$ and $w'^-_i$, each of which is the element of the watermarked host signal $W'^+$ and $W'^-$, have the m samples, respectively, corresponding to the location in which the watermark is embedded:

$$w'^+_i=\{w'^+_{i,0}, w'^+_{i,1}, \ldots, w'^+_{i,m-1}\}$$

$$w'^-_i=\{w'^-_{i,0}, w'^-_{i,1}, \ldots, w'^-_{i,m-1}\}.$$

The following decision value $z_i$ is calculated in order to determine the watermark bit $x_i$.

$$z_i = \sum_{j=0}^{m-1}(w'^+_{i,j}-w'^-_{i,j})$$

$$= \sum_{j=0}^{m-1}[(w^+_{i,j}+n^+_{i,j})-(w^-_{i,j}+n^-_{i,j})]$$

$$= \sum_{j=0}^{m-1}[(v^+_{i,j}-v^-_{i,j})+(\alpha^+_{i,j}+\alpha^-_{i,j})x_i+(n^+_{i,j}-n^-_{i,j})]$$

where $\sum_{j=0}^{m-1}(v^+_{i,j}-v^-_{i,j})$ conforms to a Gaussian distribution and approaches zero when the number m is large enough. Likewise, the noise term $\sum_{j=0}^{m-1}(n^+_{i,j}-n^-_{i,j})$ also approaches zero. Therefore, the decision value $z_i$ can be approximated by the value $\sum_{j=0}^{m-1}[(\alpha^+_{i,j}+\alpha^-_{i,j})x_i]$. Since $(\alpha^+_{i,j}+\alpha^-_{i,j})$ is positive by definition, $z_i$ is positive if the watermark bit $x_i$ is 1, and $z_i$ is negative if the watermark bit $x_i$ is -1. Therefore the value of the watermark bit $x_i$ can be determined depending on whether $z_i$ is positive or negative.

The correlation evaluator 28 evaluates the robustness of the embedded watermark by regarding the host data V as a distortion to the watermark X and calculating a correlation coefficient between the embedded watermark X and a watermark extracted from the watermarked host data W. The larger the correlation is, the greater the robustness is. The correlation evaluator 28 evaluates the correlation coefficient $g_k$ of a true value of the actual embedded watermark X and the decision value $Z^k$ of the watermark extracted from the candidate watermarked host data $W^k$, by the following formula, for the pair of candidate watermarked host data ($W^{+k}$, $W^{-k}$).

$$K = \mathrm{argmax}_k\, g_k(Z^k, X)$$

$$g_k(Z^k, X) = (1/n) Z^k \cdot X = (1/n)\Sigma_{i=0}^{n-1} z_i^k x_i,$$

where $Z^k = \{z_0^k, z_1^k, \ldots, z_{n-1}^k\}$ and $z_i^k$ is a decision value of the watermark bit $x_i^k$ and $z_i^k = \Sigma_{j=0}^{m-1}(w_{i,j}^{+k} - w_{i,j}^{-k})$.

The following normalized correlation coefficient $g_k$ may be used, depending on circumstances. The normalized correlation coefficient $g_k$ takes a value of $-1$ to $1$.

$$g_k(Z^k, X) = Z^k \cdot X / |Z^k||X|$$

$$= \Sigma_{i=0}^{n-1} z_i^k x_i / \{(\Sigma_{i=0}^{n-1}|z_i^k|^2)^{1/2}(\Sigma_{i=0}^{n-1}|x_i|^2)^{1/2}\}$$

When the variance of the decision value $Z^k$ is large, the non-normalized correlation coefficient $g_k$ has a strong correlation with a soft value $z_i^k$ which has a large magnitude, and therefore there will be a possibility that a correct watermark location cannot be identified. It is therefore necessary to normalize the correlation coefficient by the $(\Sigma_{i=0}^{n-1}|z_i^k|^2)^{1/2}$. Since the watermark bit $x_i$ is 1 or $-1$, $|x_i|^2 = 1$ and the normalized correlation coefficient $g_k$ can be written as follows:

$$g_k(Z^k, X) = \Sigma_{i=0}^{n-1} z_i^k x_i / \{(\Sigma_{i=0}^{n-1}|z_i^k|^2)^{1/2} n^{1/2}\}.$$

By selecting the candidate having the largest correlation coefficient $g_k$, the candidate having the smallest detection error in extracting the watermark bits can be selected.

In respect of the decision value $z_i$, if $v_{i,j}^+ > v_{i,j}^-$ and $x_i = 1$, $z_i >> 0$, and if $v_{i,j}^+ < v_{i,j}^-$ and $x_i = -1$, $z_i << 0$. This means that by selecting the optimal candidate watermark location $P^k$ according to the evaluation of the correlation coefficient $g_k$, a watermark location is selected so that the following formula can be possibly satisfied, in order to improve the detection performance of the watermark bit $x_i$ by the decision value $z_i$.

$$x_i \Sigma_{j=0}^{m-1} (v_{i,j}^{+k} - v_{i,j}^{-k}) > 0$$

In other words, a location is selected where the sign of the watermark bits and the sign of the noise components which is composed of the host data agree as much as possible. This is a guiding rule used in the GPS method and thereby the response of the decision value $z_i$ is improved.

The robustness of the embedded watermark can also be evaluated by calculating the signal-to-noise ratio (SNR) for the watermark extracted from the watermarked host data W. The smaller the SNR is, the greater the robustness is. Although it can be easily proved that the SNR is equivalent to the correlation coefficient, the calculation amount of the SNR is larger than that of the correlation coefficient. The evaluation method by the SNR is now described so as to be compared with the calculation amount of the correlation coefficient. The SNR is evaluated by the following formula for the pair of candidate watermarked host data ($W^{+k}$, $W^{-k}$) and the optimal candidate K is selected.

$$K = \mathrm{argmax}_k (P_k / (\sigma_k^2))$$

$$P_k = \Sigma_{i=0}^{n-1} |\Sigma_{j=0}^{m-1}(w_{i,j}^{+k} - w_{i,j}^{-k})|^2 / n$$

$$\sigma_k^2 = \Sigma_{i=0}^{n-1} |\Sigma_{j=0}^{m-1}(w_{i,j}^{+k} - w_{i,j}^{-k}) - P_k^{1/2} x_i|^2 / n$$

Here, $P_k = \Sigma_{i=0}^{n-1} |z_i^k|^2 / n$ and $$\sigma_k^2 = \Sigma_{i=0}^{n-1} |z_i^k - P_k^{1/2} x_i|^2 / n$$

$$= \Sigma_{i=0}^{n-1} (|z_i^k|^2 - 2P_k^{1/2} x_i z_i^k + P_k |x_i|^2)/n$$

$$= P_k - (2/n) P_k^{1/2} \Sigma_{i=0}^{n-1} x_i z_i^k + P_k$$

$$= 2P_k - (2/n) P_k^{1/2} \Sigma_{i=0}^{n-1} x_i z_i^k.$$

Therefore, the SNR can be calculated as follows.

$$P_k / \sigma_k^2 = P_k / \{2P_k - (2/n) P_k^{1/2} \Sigma_{i=0}^{n-1} x_i z_i^k\}$$

$$= 1/\{2 - 2\Sigma_{i=0}^{n-1} x_i z_i^k / (n P_k^{1/2})\}$$

$$= 1/\{2 - 2\Sigma_{i=0}^{n-1} x_i z_i^k / (n (\Sigma_{i=0}^{n-1} |z_i^k|^2 / n)^{1/2})\}$$

$$= 1/\{2 - 2\Sigma_{i=0}^{n-1} x_i z_i^k / (n^{1/2} (\Sigma_{i=0}^{n-1} |z_i^k|^2)^{1/2})\}$$

$$= 1/\{2 - 2 g_k(z^k, x)\}$$

According to this relationship between the correlation coefficient $g_k(z^k, x)$ and the SNR $P_k/\sigma_k^2$, $P_k/\sigma_k^2 \to \infty$ when $g_k \to 1$. Therefore, the selection of the candidate with the largest correlation coefficient $g_k$ is equivalent to the selection of the candidate with the largest SNR.

However, in respect to the calculation amount, the calculation of the SNR requires $(4mn+n-2)$ times of summation and $(2n+1)$ times of multiplication resulting in a heavy calculation load. On the other hand, the calculation of the non-normalized correlation coefficient requires $\Sigma_{i=0}^{n-1} z_i^k x_i$. Since the watermark bit $x_i$ is 1 or $-1$, the multiplication is not necessary and the correlation coefficient can be calculated by only $(2mn-1)$ times of summation, and therefore the calculation cost can be greatly decreased. In the case of calculating the normalized correlation coefficient, $(2mn+n-2)$ times of summation and $(n+1)$ times of multiplication is required but the calculation amount is less than that of the SNR.

If a specific process such as filtering or compression to be performed on the watermarked host data W is anticipated beforehand, the effect by the specific process is considered when the watermark is embedded and thereby the robustness of the watermark can be ensured to a distortion caused by the specific process.

The correlation evaluator 28 evaluates the robustness of the watermark X for the watermarked host data W in respect of a distortion D caused by the specific process to be performed on the host data W. Specifically, after the specific process is beforehand performed on the watermarked host data W, the correlation coefficient between the true values of the actual embedded watermark X and the detection values of the watermark extracted from the watermarked host data W is calculated by the following formula.

$$g_k(Z^k, X) = (1/n) \Sigma_{i=0}^{n-1} z_i^k x_i$$

$$= (1/n) \Sigma_{i=0}^{n-1} \Sigma_{j=0}^{m-1} (w_{i,j}^{*+k} - w_{i,j}^{*-k}) x_i$$

where $w_{i,j}^{*+k}$, $w_{i,j}^{*-k}$ are the watermarked host data W on which the specific process has been performed. If the specific process is known in advance and it is, for instance, JPEG compression, $w_{i,j}^{*+k}$ and $w_{i,j}^{*-k}$ can be calculated by the following formula using a quantization table in JPEG.

$$w_{i,j}^{*+k} = \mathrm{round}(w_{i,j}^{+k} / q_{i,j}) q_{i,j}$$

$$w_{i,j}^{*-k} = \mathrm{round}(w_{i,j}^{-k} / q_{i,j}) q_{i,j},$$

where $q_{i,j}$ is the value of the location (i,j) in the quantization table in JPEG and round( ) is a round function used in the JPEG compression.

With this, since a distortion caused by a specific process to be performed on the watermarked host data is anticipated in evaluating the robustness and the watermark location is selected, the watermark that is highly tolerant toward the specific process can be generated.

According to the digital watermark embedding apparatus 50 in this embodiment, when media data to be watermarked are given, the location in which a given watermark is to be stickily embedded can be detected depending on the media data, and the robustness of the watermark embedded in the media data can be improved. When the watermark is embedded in such the location, the media data is not subject to degradation while the robustness of the watermark is enhanced. Therefore it is possible to make the digital watermark robust against signal processing, geometric transform, compression, attacks and so on, and thereby the detection accuracy in extracting the watermark is highly improved. Furthermore, when a specific process to be performed on the media data is anticipated, the robustness of the watermark is evaluated after the specific process is performed, and therefore the watermark that is highly tolerant toward the specific process can be selected and embedded. Moreover, since the robustness of the watermark is evaluated by the correlation coefficient, the calculation amount is less than that of the SNR.

Figure 6:
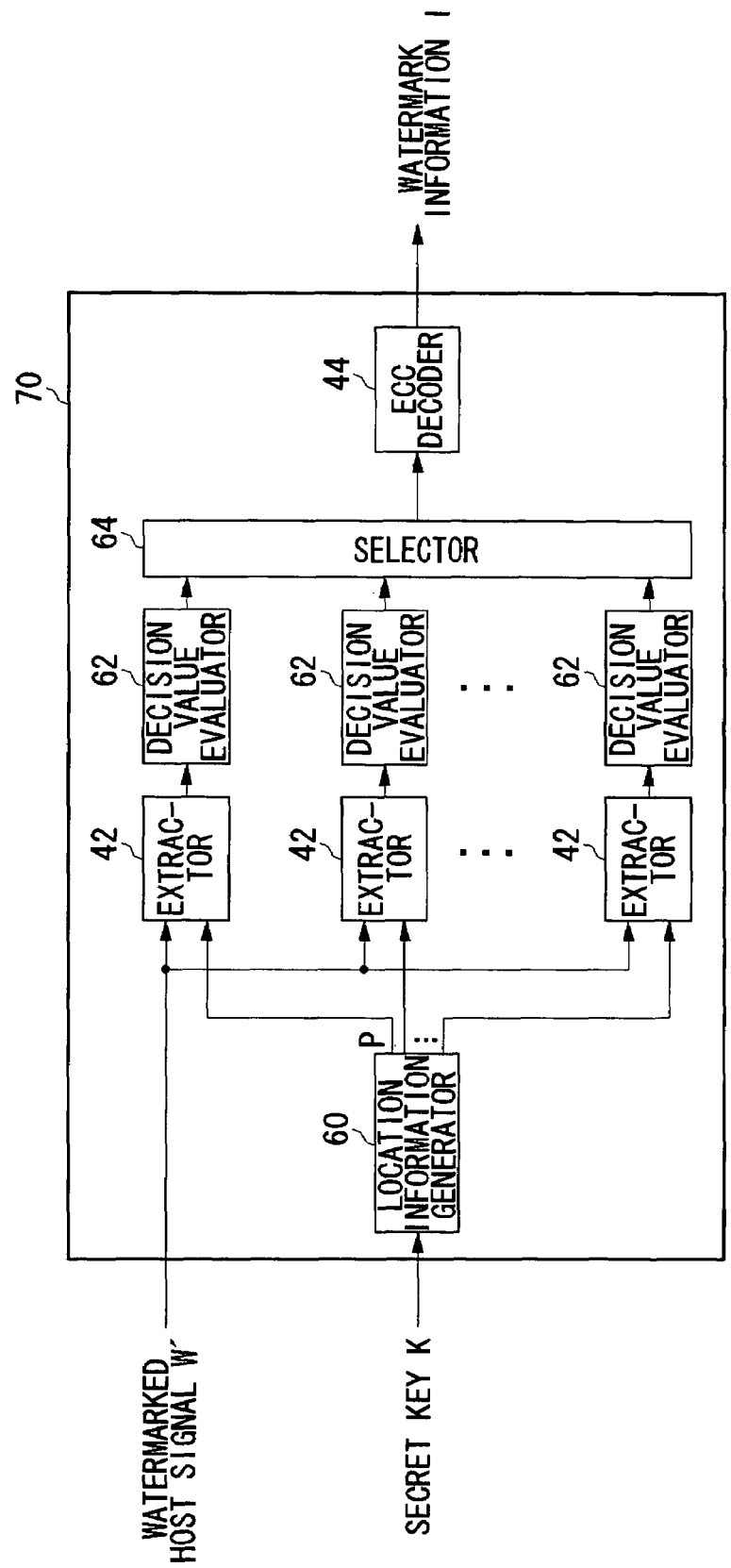
FIG. 6 shows a structure of a digital watermark extracting apparatus according to Embodiment 1.

FIG. 6 shows a structure of a digital watermark extracting apparatus 70 according to Embodiment 1. It should be understood by those skilled in the art that these functional blocks of the digital watermark extracting apparatus 70 can also be realized by various modes such as hardware only, software only or a combination thereof.

The watermarked host data W in which a digital watermark has been embedded by the digital watermark extracting apparatus 70 is distributed via a network and utilized in a computer. During these processes, the watermarked host data W are subject to operations such as compression and malicious attacks. In the case of image data, the data are subject to utility operations, for instance, signal processing such as JPEG compression, filtering, quantization, or color correction, or geometric transformation such as scaling, cropping, rotating, or parallel shifting, and also subject to illegal attacks such as removing or altering the digital watermark. Transformation by such operations adds a noise N to the watermarked host data W and the watermarked host data W with the noise N added is called a watermarked host signal W'. The digital watermark extracting apparatus 70 performs a process for extracting the watermark X from the noisy watermarked host signal W' and obtaining the watermark information I by error correction.

A location information generator 60 generates L candidate watermark locations P according to a secret key K. The location information generator 60 generates the candidate watermark locations by referring to the same table as that of FIG. 3 which the location information generator 60 of the digital watermark embedding apparatus 50 refers to.

L extractors 42 each extract the watermark X hidden in the watermarked host signal W' from each of the L candidate watermark locations P given by the location information generator 60 and detects a decision value Z on the watermark X. Only one among the L candidate watermark locations P is the true watermark location in which the watermark X has been actually embedded. L decision value evaluators 62 each evaluate the significance of the decision value Z for each of the L watermarks X. A selector 64 determines the true watermark location according to the significance of the decision value Z on the L watermarks X evaluated by the decision value evaluator 62. The selector 64 provides to an ECC decoder 44 the decision value Z on the watermark X extracted from the true watermark location.

The ECC decoder 44 decodes the decision value Z on the watermark X and outputs the watermark information I.

In the embodiment, L extractors 42 and L decision value evaluators 62 are provided in parallel to extract the watermark X from each of the L candidate watermark locations in the watermarked host data W and evaluate the decision value on the watermark X. Alternatively, a single extractor 42 and a single decision value evaluator 62 may be provided. With this configuration, the watermark X is sequentially extracted from L candidate watermark locations in the watermarked host data W and then the decision value is evaluated. Thereby the L candidate watermark locations can be sequentially evaluated and the selector 64 can finally determine the true watermark location.

Figure 7:
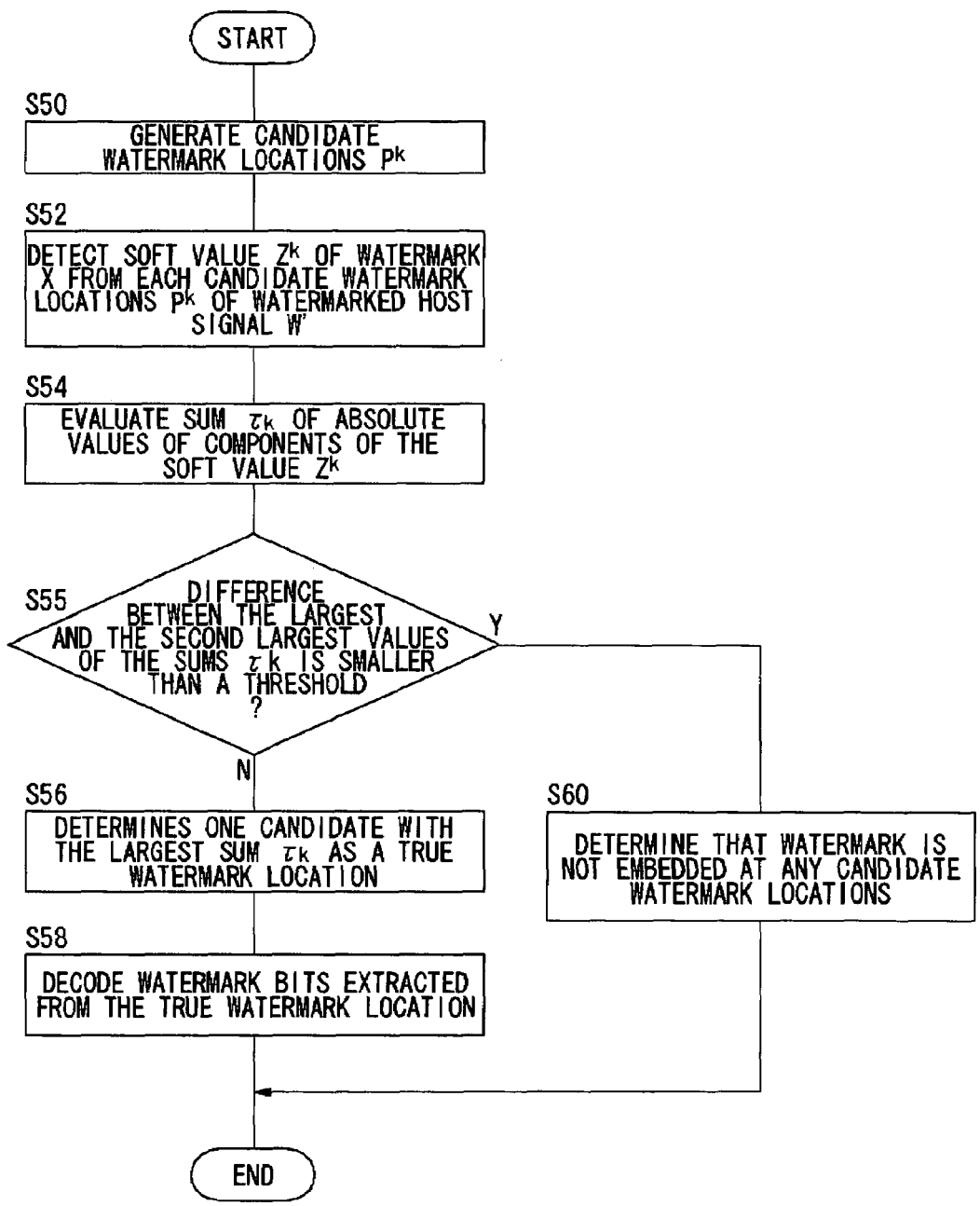
FIG. 7 is a flowchart showing a procedure of extracting a watermark which is employed by the digital watermark extracting apparatus of FIG. 6.

FIG. 7 is a flowchart showing the procedure of extracting the watermark which is employed by the digital watermark extracting apparatus 70.

The location information generator 60 generates L candidate watermark locations $P^k$ according to the secret key K (S50). The extractor 42 extracts the watermark X from each of the L candidate watermark locations $P^k$ and detects the soft decision value $Z^k$ on the extracted watermark X (S52) Each component $z_i^k$ of the soft value $Z^k$ is a decision value of the watermark bit $x_i$ and calculated by the following formula.

$$z_i^k = \Sigma_{j=0}^{m-1}(w'^{+k}_{i,j} - w'^{-k}_{i,j})$$

The decision value evaluator 62 evaluates a sum $\tau_k$ of the absolute values of the components of each of the L soft values $Z^k$ (S54).

$$\tau_k = \Sigma_{i=0}^{n-1}|z_i^k| = \Sigma_{i=0}^{n-1}|\Sigma_{j=0}^{m-1}(w'^{+k}_{i,j} - w'^{-k}_{i,j})|,$$

where $w'^{+k}_{i,j} = w^+_{i,j} + n^+_{i,j} = v^{+k}_{i,j} + \alpha^+_{i,j}b^{+k}_{i,j} + n^{+k}_{i,j}$, $w'^{-k}_{i,j} = w^-_{i,j} + n^-_{i,j} = v^{-k}_{i,j} + \alpha^-_{i,j}b^{-k}_{i,j} + n^{-k}_{i,j}$. Here $b^{+k}_{i,j}$, $b^{-k}_{i,j}$ is a value of the watermark bit possibly hidden in the location (i,j) in the host data V. By assigning this into the formula, the sum $\tau_k$ of the absolute values for the soft values $Z^k$ can be rewritten as follows.

$$\tau_k = \Sigma_{i=0}^{n-1}|\Sigma_{j=0}^{m-1}[(v^{+k}_{i,j} + \alpha^+_{i,j}b^{+k}_{i,j}) - (v^{-k}_{i,j} - \alpha^-_{i,j}b^{-k}_{i,j} + n^{-k}_{i,j})]|$$

$$= \Sigma_{i=0}^{n-1}|\Sigma_{j=0}^{m-1}[(v^{+k}_{i,j} - v^{-k}_{i,j}) + (\alpha^+_{i,j} + \alpha^-_{i,j}b^{-k}_{i,j}) + (n^{+k}_{i,j} - n^{-k}_{i,j})]|,$$

where $\Sigma_{j=0}^{m-1}(v^+_{i,j} - v^-_{i,j})$ conforms to a Gaussian distribution and approaches zero when the number m is large enough. Likewise, the noise term $\Sigma_{j=0}^{m-1}(n^{+k}_{i,j} - n^{-k}_{i,j})$ also approaches zero. Therefore, the sum $\tau_k$ of the absolute soft values $z_i^k$ can be approximated as follows:

$$\tau_k \approx \Sigma_{i=0}^{n-1}|\Sigma_{j=0}^{m-1}(\alpha^+_{i,j}b^{+k}_{i,j} + \alpha^-_{i,j}b^{-k}_{i,j})|.$$

If the watermark X has been embedded in the k-th location, then $b^{+k}_{i,j} = b^{-k}_{i,j} = x_i$. Therefore, when the number m is large enough, $$\tau_k \approx \Sigma_{i=0}^{n-1}|\Sigma_{j=0}^{m-1}(\alpha^+_{i,j} + \alpha^-_{i,j})x_i| >> 0.$$

If the watermark X has not been embedded in the k-th location, the probability such that $b^{\pm k}_{i,j} = 1$ or $b^{\pm k}_{i,j} = -1$ is $P(b^{\pm k}_{i,j} = 1) = P(b^{\pm k}_{i,j} = -1) = \frac{1}{2}$. Therefore, $\Sigma_{j=0}^{m-1}(\alpha^+_{i,j}b^{+k}_{i,j} + \alpha^-_{i,j}b^{-k}_{i,j})$ can be probabilistically approximated by zero and $\tau_k \approx 0$. Here, the reason $b^{\pm k}_{i,j}$ becomes 1 or −1 equiprobably is that the table shown in FIG. 3 in which the random locations are defined is used.

If the watermark X has been embedded in the k-th location, the soft value $z_i^k$ on the watermark bit $x_i$ can be regarded as a significant data, or the sum $\tau_k$ of the absolute soft values $z_i^k$ has a large positive value. However, if the watermark X has not been embedded in the k-th location, the soft value $z_i^k$ on the watermark bit $x_i$ is regarded as insignificant data and the sum $\tau_k$ of the absolute soft values $z_i^k$ takes a value close to zero. Therefore, according to the value of the sum $\tau_k$ of the absolute soft values $z_i^k$, it can be determined whether the watermark has been embedded in the k-th location or not.

If the difference between the largest value and the second largest value among the L sums $\tau_k$ of the absolute soft values $z_i^k$ is smaller than a predefined threshold (Y of S55), the selector 64 determines that there is no watermark embedded in any candidate watermark locations and terminates the procedure without extracting any watermark (S60). With this, the false detection of the watermark can be prevented when the watermark X has not been embedded in any candidate watermark locations.

If the difference between the largest value and the second largest value among the L sums $\tau_k$ of the absolute soft values $z_i^k$ is equal to or larger than a predefined threshold (N of S55), the selector 64 selects one candidate k* with the largest sum $\tau_k$ of the absolute soft values $z_i^k$ and determines that k*-th candidate watermark location $P^{k*}$ is a true watermark location (S56). Thus, by comparing the L sums $\tau_k$ of the absolute soft values $z_i^k$ with each other, the true watermark location can be selected from the L candidate watermark location $P^k$. Instead of calculating the sum of the absolute soft values $z_i^k$, the sum of the squares of the soft values $z_i^k$ may be calculated and then the significance of the soft value $Z^k$ may be evaluated.

The selector 64 selects the soft value $Z^{k*}$ of the watermark X extracted from the true watermark location and provides it to the ECC decoder 44. The ECC decoder 44 decodes the soft value $Z^{k*}$ (S58). Thus, based on the assumption that the watermark X has been embedded in the determined true watermark location, the watermark bit $x_i$ is extracted from the true watermark location and then decoded.

If the ECC decoder 44 is configured as a hard-input decoder, whether watermark bit $x_i$ is -1 or 1 is determined depending on whether the decision value $z_i$ is negative or positive, and the hard decision values are sent to the ECC decoder 44.

Instead of the ECC decoder 44 being provided immediately after the selector 64, L ECC decoders 44 may be provided between the extractors 42 and the decision value evaluators 62. In this case, the ECC decoder 44 corrects errors within the decision value Z on the watermark X extracted from the extractor 42 and provides the error corrected decision value Z to the decision value evaluator 62. The decision value evaluator 62 evaluates the significance of the corrected decision value Z. For instance, if the ECC decoder capable of outputting soft values is used, the decision value evaluator 62 evaluates the significance using the decoded soft values. If the ECC decoder only capable of making a hard decision is used, CRC (Cyclic Redundancy Check) code may be attached to the watermark bit sequence so that the decision value evaluator 62 can evaluate the significance of the decision value Z. In other words, it can be determined whether the decision value Z has been extracted from the true location or not, by detecting any possible bit errors in the corrected watermark bit sequence using CRC.

Compared to this configuration in which L ECC decoders 44 are provided after the L extractors 42, the configuration in which a single ECC decoder 44 is provided after the selector 64 as shown in FIG. 6 has an advantage such that the number of ECC decoders 44 that require complicated computation can be decreased, resulting in a simplified hardware configuration. Instead of L sets of the extractor 42, ECC decoder 44 and decision value evaluator 62 being provided, a single set of the extractor 42, ECC decoder 44 and decision value evaluator 62 may be provided so as to sequentially evaluate the L candidate watermark locations. Even in such the configuration, since the decoding process requires complicated computation, it is advantageous in respect of computation cost that the ECC decoder 44 performs the decoding process after the selector 64 determines the true watermark location as shown in FIG. 6.

As stated above, according to the digital watermark extracting apparatus 70 in this embodiment, even if there are a plurality of candidate watermark locations, a true watermark location can be automatically determined based on the significance of the decision value on watermark without any anticipated watermark being given, and then the watermark can be extracted from the true watermark location. Therefore, the method can also be applied to some applications for which an embedded watermark cannot be anticipated. Moreover, by using soft decision values, the accuracy of evaluating the significance of the decision value is improved so that the watermark location can be determined correctly. Furthermore, the bit error rate of the watermark can be decreased using soft values.

Embodiment 2

Figure 8:
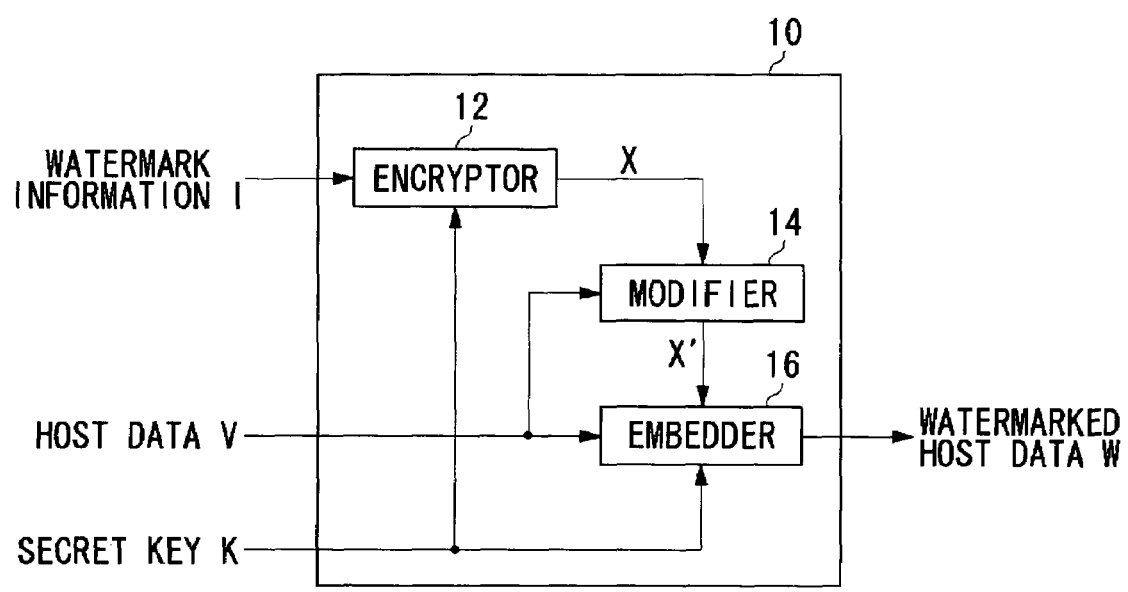
FIG. 8 shows a structure of a digital watermark embedding apparatus according to Embodiment 2.

FIG. 8 shows a structure of a digital watermark embedding apparatus 10 according to Embodiment 2. The digital watermark embedding apparatus 10 in this embodiment scrambles the watermark X so as to generate a plurality of candidate watermarks, embeds each of the candidate watermarks into the host data V, selects one candidate for which the robustness of the watermark is the best, and outputs it as watermarked host data W. The same structures as the digital watermark embedding apparatus 50 in Embodiment 1 are denoted by the same numerals and the explanation thereof is omitted, and the structures and behaviors different from Embodiment 1 are explained below.

The digital watermark embedding apparatus 10 performs a process for embedding watermark information I in host data V and outputs watermarked host data W. An encryptor 12 encrypts the watermark information I to be embedded in the host data V using a secret key K and outputs a watermark X. When this encryption function is denoted by $f_0$, the encryption process can be represented by a transformation equation $X=f_0(I, K)$. If the watermark information I does not need to be encrypted, the configuration of the encryptor 12 may be omitted.

A modifier 14 scrambles the watermark X using the host data V and outputs a scrambled watermark X'. When this scrambling function is denoted by $f_2$, the scrambling process can be represented by a transformation equation $X'=f_2(X, V)$.

An embedder 16 embeds the scrambled watermark X' in the host data V using the secret key K and outputs watermarked host data W. When the watermarking function is denoted by $f_1$, the watermarking process can be represented by a transformation equation $W=f_1(V, X', K)$. If a watermarking method which does not depend on the secret key K is applied, the process is represented by $W=f_1(V, X')$.

The modifier 14 and the embedder 16, in cooperation with each other, generate a plurality of the scrambled watermarks X' and embed each of them in the host data V, and thereby generate a plurality of candidate watermarked host data W and selects one of the candidates.

Figure 9:
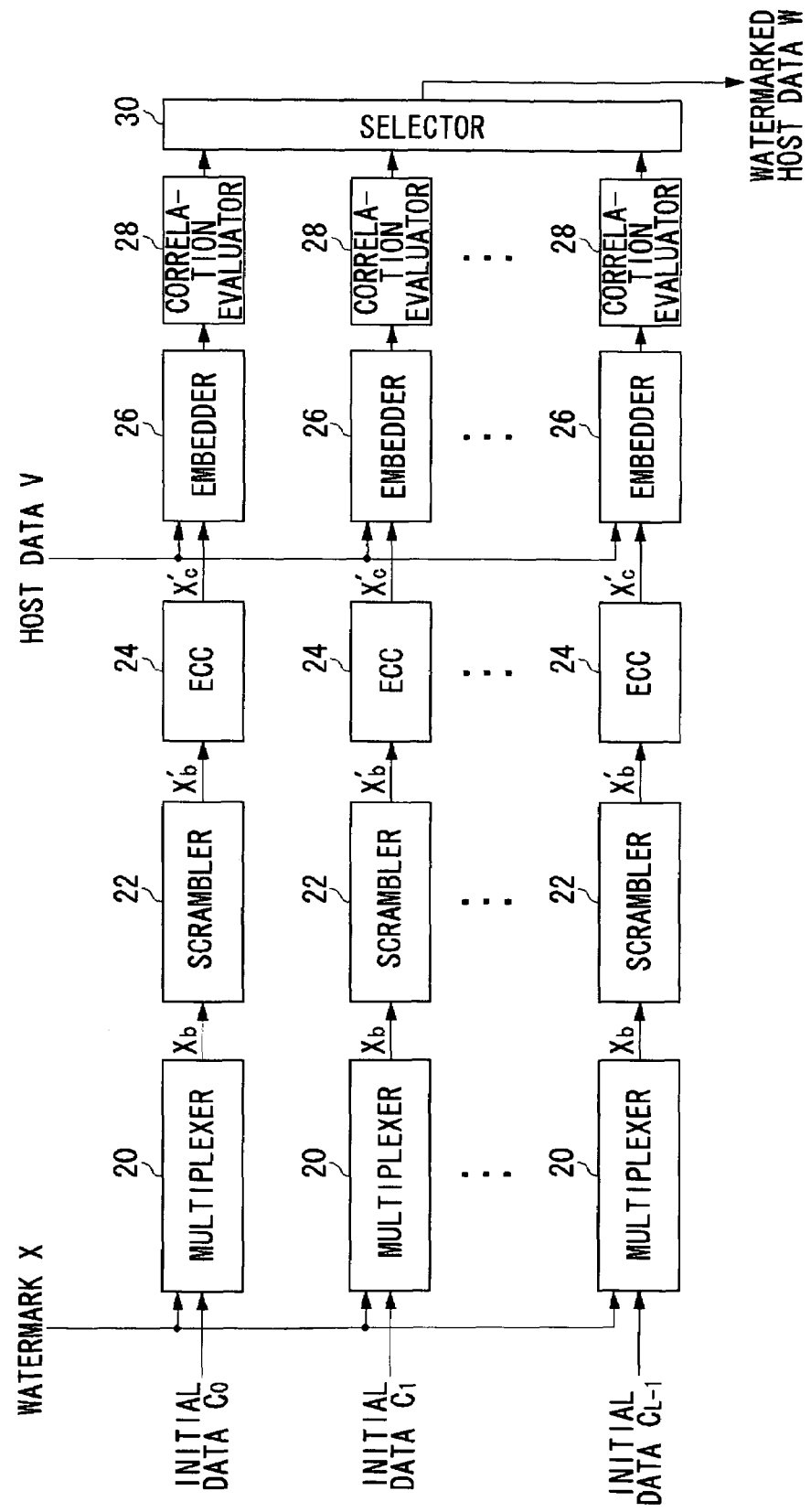
FIG. 9 is a block diagram of the modifier and the embedder of FIG. 8.

FIG. 9 is a block diagram of the modifier 14 and the embedder 16. L multiplexers 20 generate L kinds of bit sequences $X_b$ by adding initial data $C_0$ to $C_{L-1}$ to the head of the watermark X. L scramblers 22 scramble the L kinds of bit sequences respectively and generate L kinds of scrambled watermark $X'_b$. L error correction coders (ECCs) 24 generate watermarks $X'_c$ by adding the parity bits to the respective scrambled watermarks $X'_b$. The ECC 24 is an option for improving the detection rate of the watermark bits and therefore this configuration may be omitted according to the different applications.

L embedders 26 embed the L kinds of scrambled watermarks $X'_c$ in the host data V respectively and generate L kinds of candidate watermarked host data W. L correlation evaluators 28 each evaluate the robustness of the watermark X hidden in the L kinds of candidate watermarked host data W. The evaluation of the robustness of the watermark X is done by calculating a correlation coefficient between the embedded watermark bits and the watermark data extracted from the watermarked host data W. A selector 30 selects one of the L kinds of candidate watermarked host data W for which the evaluated value of the robustness is the best, and outputs it as watermarked host data W.

Figure 10:
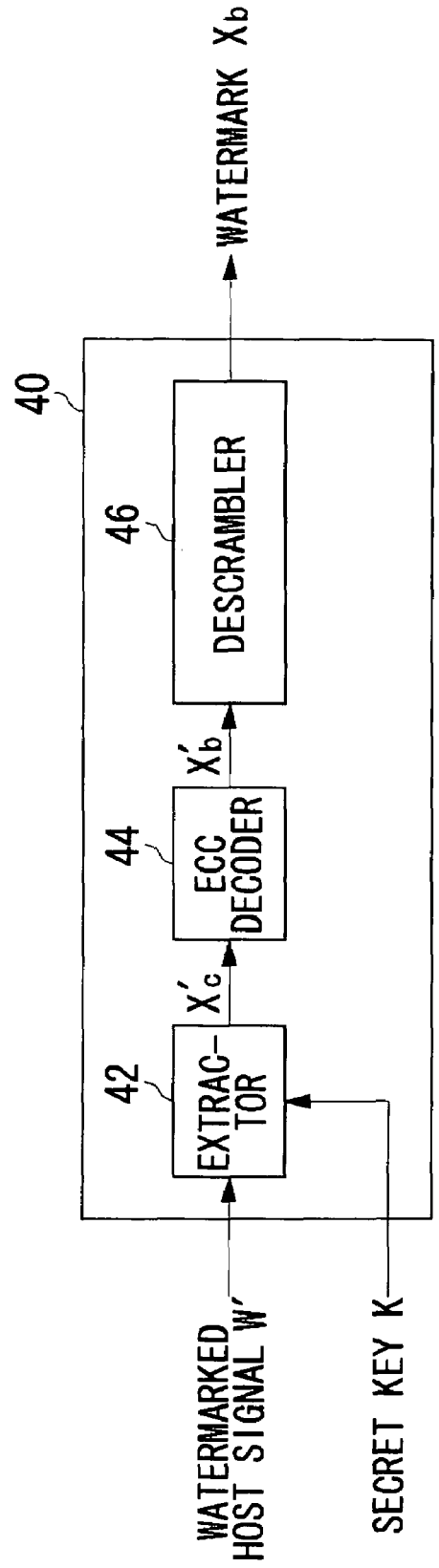
FIG. 10 shows a structure of a digital watermark extracting apparatus according to Embodiment 2.

FIG. 10 shows a block diagram of a digital watermark extracting apparatus 40 according to Embodiment 2. The digital watermark extracting apparatus 40 performs a process for extracting the embedded watermark X from the host signal W' with a noise N added.

An extractor 42 extracts a watermark $X'_c$ from the watermarked host signal W' using the secret key K. An ECC decoder 44 corrects errors using the parity bits within the watermark $X'_c$ and thereby generates a watermark $X'_b$. A descrambler 46 descrambles the corrected watermark $X'_b$ and thereby outputs a watermark $X_b$. The watermark $X_b$ is further decoded by the secret key K and the original watermark information I is obtained, although the last process is not shown in the figure.

The procedures of embedding and extracting a watermark by the above-mentioned configuration of the digital watermark embedding apparatus 10 and the digital watermark extracting apparatus 40 are now explained. FIG. 15 is a flowchart showing the watermark embedding procedure employed by the digital watermark embedding apparatus 10. FIG. 11 to FIGS. 14A and 14B are referred to in the explanation of the flowchart. The multiplexer 20 multiplexes L kinds of initial data at the head of the watermark X encrypted by the encryptor 12 and thereby generates L kinds of code sequences (S10), and the scrambler 22 scrambles these code sequences and thereby generates L kinds of scrambled watermarks X' (S12).

Figure 11:
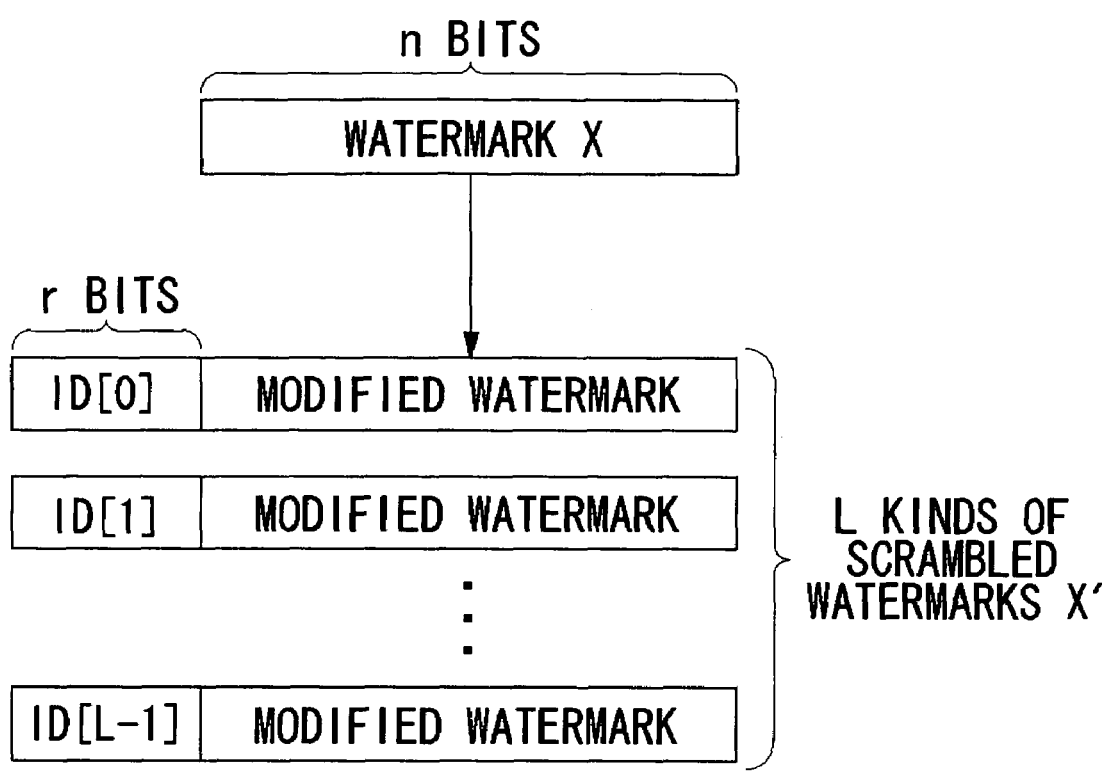
FIG. 11 shows a relationship between an original watermark and L kinds of scrambled watermarks.

FIG. 11 shows a relationship between the watermark X and the L kinds of scrambled watermarks X'. As identification data ID[0] to ID[L−1], r-bit redundant words are added to the head of n-bit watermark X and thus the L kinds of candidate watermarks are generated. At most $2^r$ kinds of candidates are generated. The bit sequences of the watermark X within the respective candidates are scrambled by a scrambling method that is described below.

As one of the scrambling methods, a guided scrambling (GS) technique is adopted. By this method, a variety of candidates for the encoded sequence can be easily generated.

The multiplexer 20 and the scrambler 22 of the digital watermark embedding apparatus 10 together function as a part of GS encoder. The GS encoder augments an n-bit source sequence D(x) with L kinds of r-bit redundant words $c_i$ (i=0, ..., L−1) to generate L augmented source sequence $c_i x^n + D(x)$. The length of the augmented sequence is (n+r) bits. Next, the augmented source sequences are divided by the scrambling polynomial S(x) of degree N to obtain quotients $T_i(x)$.

$$T_i(x) = Q_{s(x)}[(c_i x^n + D(x))x^N] \quad (1)$$

where $Q_a[b]$ represents the quotient of a polynomial b divided by a polynomial a. The quotient set $\{T_0(x), ..., T_{L-1}(x)\}$ is a set of candidate scrambled code sequences. For each candidate, performance when the code sequence is really used is evaluated and the one for which the evaluated value is best is selected as the final code sequence.

In decoding, the descrambler 46 of the digital watermark extracting apparatus 40 functions as a GS decoder. The GS decoder multiplies the code sequence by S(x) and discards the lower n bits and upper r bits to obtain the original source sequence D(x).

The case in which the scrambling polynomial $S(X) = x^r + 1$ is applied, is herein explained. When $S(X) = x^r + 1$, the expression (1) can be represented by a convolutional operation as follows.

$$t_j = d_j \oplus c_i \quad (j=0)$$

$$t_j = d_j \oplus t_{j-1} \quad (j=1, ..., n/r-1)$$

where i=0, ..., L−1 and $d_j$ represents a bit sequence obtained from the original source sequence D(x) being segmented by every r bit, and $t_j$ represents a bit sequence obtained from the code sequence $T_i(x)$ being segmented by every r bit. The r-bit redundant word $c_i$ is at the head of $T_i(x)$. Herein $\oplus$ denotes an exclusive-OR operation.

Figure 12:
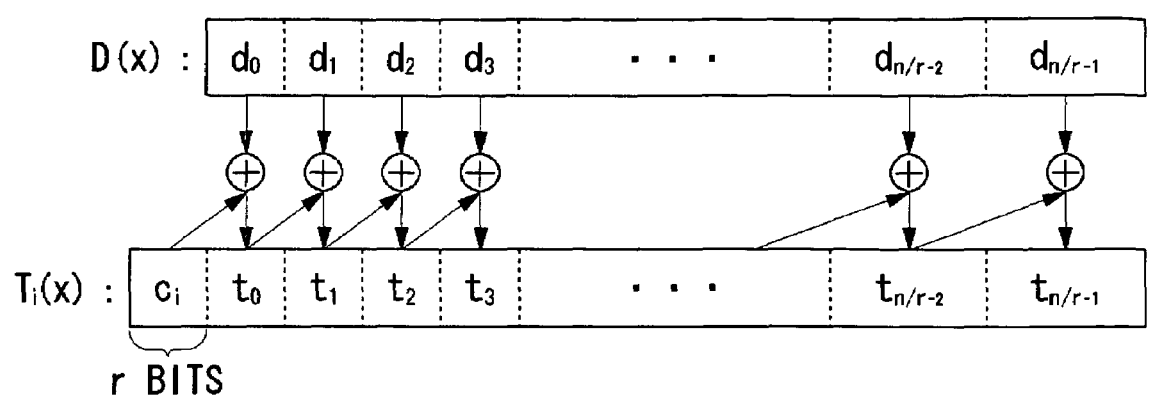
FIG. 12 explains a convolutional operation during an encoding process.

FIG. 12 explains the convolutional operation during the encoding process. For instance, let n be 6 and r be 2. The redundant word $c_0 = (0,0)$ is added to $D(x) = (1,0,1,0,0,1)$ and then a converted code sequence $T_0(x)$ is generated. By the above-mentioned convolutional operation in the encoding, $t_0 = d_0 \oplus c_0 = (1,0) \oplus (0,0) = (1,0)$, $t_1 = d_1 \oplus t_0 = (1,0) \oplus (1,0) = (0,0)$, and $t_2 = d_2 \oplus t_1 = (0,1) \oplus (0,0) = (0,1)$, and thus the converted code sequence $T_0 = (0,0,1,0,0,0,0,1)$ is obtained. It is to be noted that the head 2-bit data of the converted code sequence $T_0$ is the redundant word $c_0$.

Likewise, for the redundant word $c_1 = (0,1)$, $c_2 = (1,0)$, $c_3 = (1,1)$, the converted code sequences $T_1 = (0,1,1,1,0,1,0,0)$, $T_2 = (1,0,0,0,1,0,1,1)$, and $T_3 = (1,1,0,1,1,1,1,0)$ are obtained, respectively.

In decoding, the original source sequence D(x) is obtained by the following convolutional operation.

$$d_j = t_j \oplus c_1 \quad (j=0)$$

$$d_j = t_j \oplus t_{j-1} \quad (j=1, ..., n/r-1)$$

Figure 13:
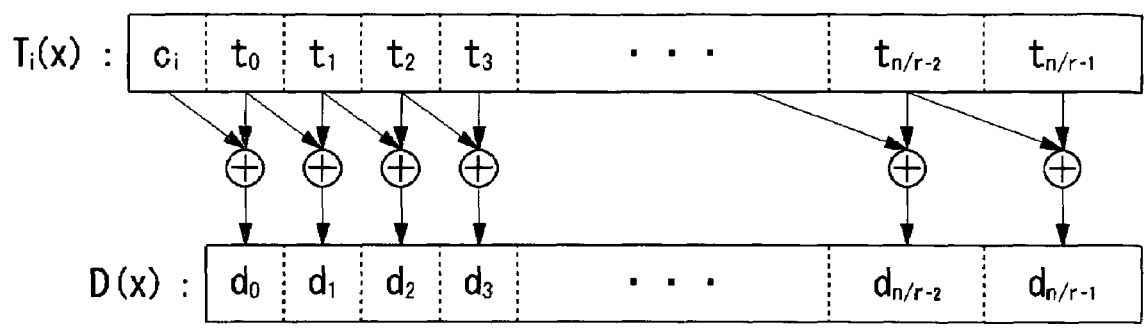
FIG. 13 explains a convolutional operation in a decoding process.

FIG. 13 explains the convolutional operation in the decoding process. When the converted code sequence $T_0 = (0,0,1,0,0,0,0,1)$ is given in the above-mentioned example, the redundant word $c_0 = (0,0)$ is obtained from the head 2-bit data of the sequence. By the above-mentioned convolutional operation in the decoding, $d_0 = t_0 \oplus c_0 = (1,0) \oplus (0,0) = (1,0)$, $d_1 = t_1 \oplus t_0 = (0,0) \oplus (1,0) = (1,0)$, and $d_2 = t_2 \oplus t_1 = (0,1) \oplus (0,0) = (0,1)$. For the other converted code sequences $T_1$, $T_2$ and $T_3$, the original source code D(x) is obtained likewise by this convolutional operation.

Referring to FIG. 15 again, the L kinds of watermarks X' generated by the scrambler 22 are augmented with parity bits by the ECC 24 and then the L kinds of parity added watermarks are embedded into the host data V by the embedder 26 (S14).

Figure 14A:
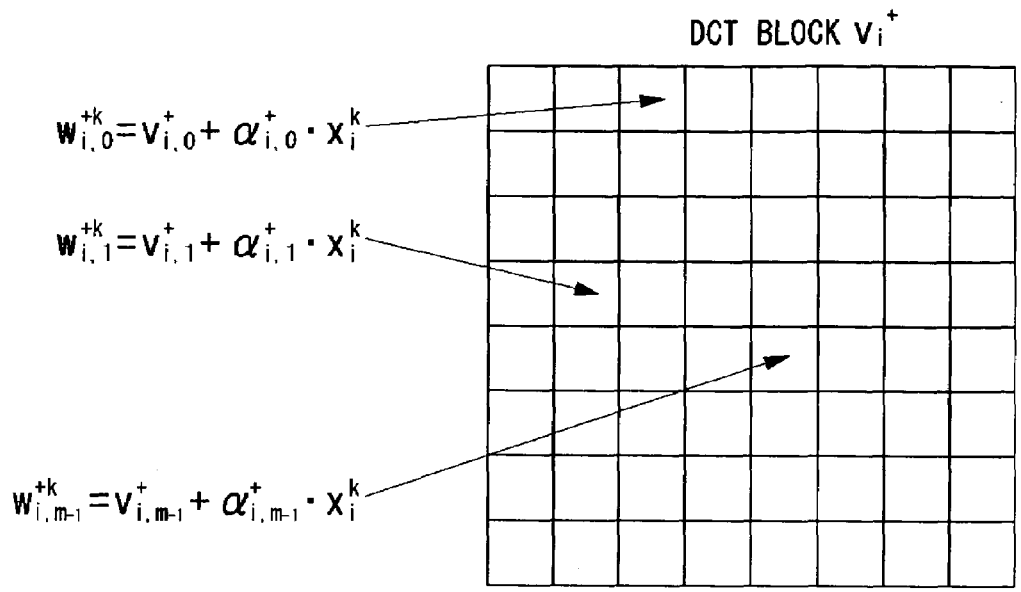
FIGS. 14A and 14B explain how a scrambled watermark is embedded.
Figure 14B:
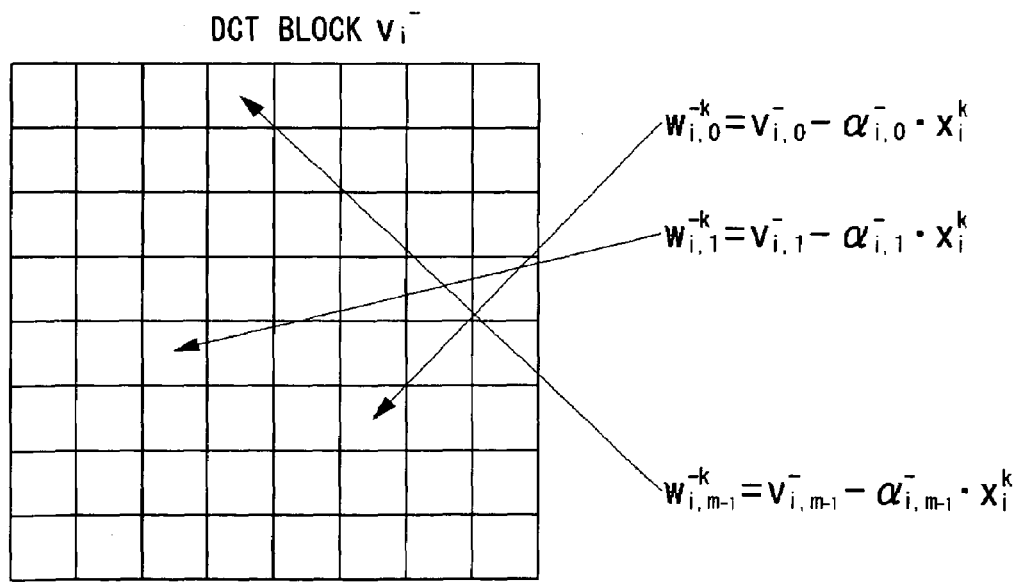
Figure 15:
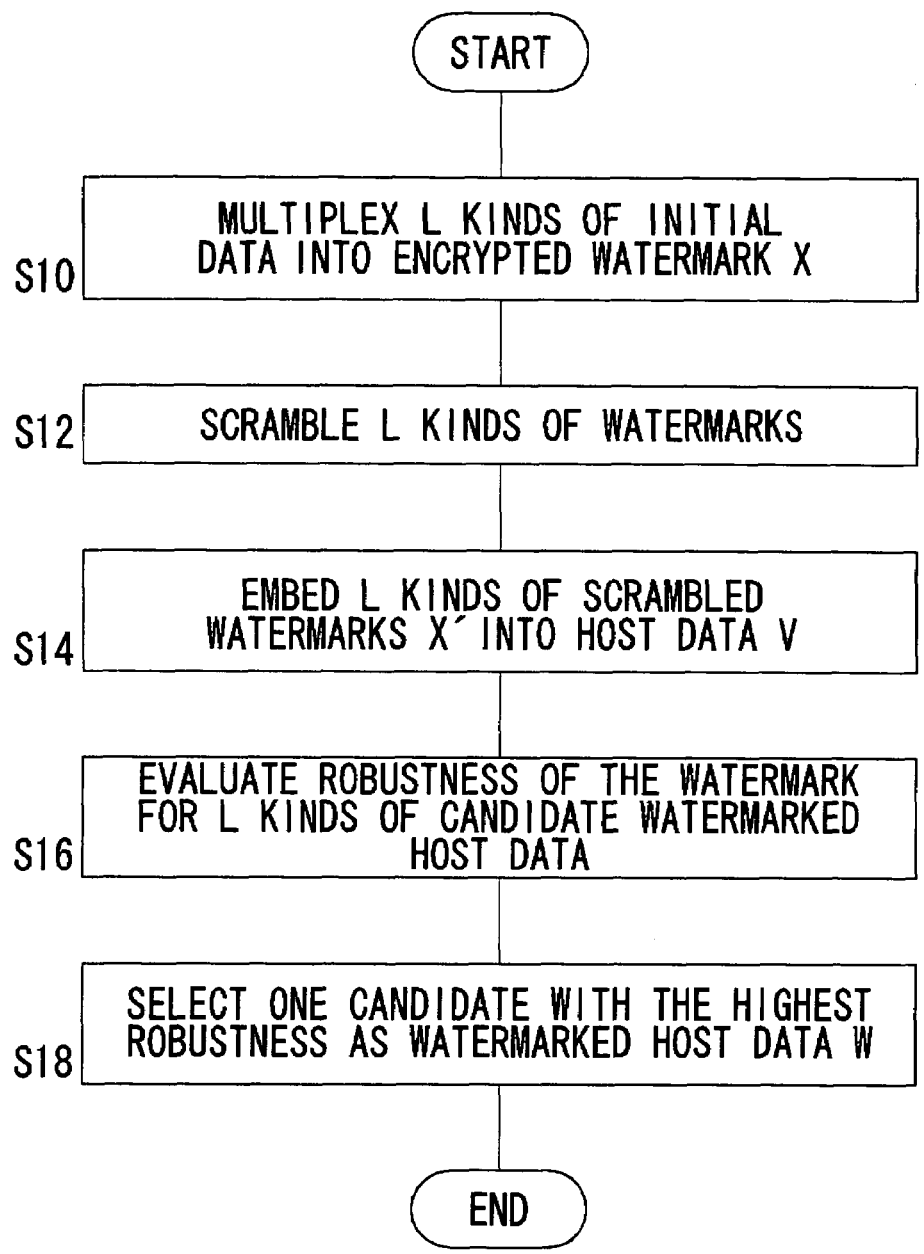
FIG. 15 is a flowchart showing a watermark embedding procedure employed by the digital watermark embedding apparatus of FIG. 8.

FIGS. 14A and 14B explain how the scrambled watermark X' is embedded. Let L kinds of scrambled watermark $X'$ be $x^0, x^1, \ldots, x^{L-1}$. The bit sequence of each candidate watermark is represented as follows. The head r-bit data indicate the identification data. Hereinafter the bit "0" after the scrambling is replaced by "−1" and then the subsequent processes are conducted.

$$x^0 = \{-1, \ldots, -1, -1, x^0_0, x^0_1, \ldots, x^0_{n-r-1}\}$$

$$x^1 = \{-1, \ldots, -1, 1, x^1_0, x^1_1, \ldots, x^1_{n-r-1}\}$$

$$\ldots$$

$$x^{L-1} = \{1, \ldots, 1, 1, x^{L-1}_0, x^{L-1}_1, \ldots, x^{L-1}_{n-r-1}\}$$

A pair of sample sets $(V^+, V^-)$ is defined as follows. The samples in which an n-bit watermark is embedded are selected from the host data V. The sample sets $V^+$ and $V^-$ each contain n elements.

$$V^+ = \{v^+_0, v^+_1, \ldots, v^+_{n-1}\}$$

$$V^- = \{v^-_0, v^-_1, \ldots, v^-_{n-1}\},$$

where each subset $v^+_i$ and $v^-_i$, an element of the sample sets $V^+$ and $V^-$, respectively, is composed of m samples of the host data V.

$$v^+_i = \{v^+_{i,0}, v^+_{i,1}, \ldots, v^+_{i,m-1}\}$$

$$v^-_i = \{v^-_{i,0}, v^-_{i,1}, \ldots, v^-_{i,m-1}\}$$

The candidate watermarks $x^k$ (k=0, \ldots, L-1) are embedded into the pair of the sample sets $(V^+, V^-)$ as follows and thus L kinds of candidate watermarked host data $W^k$ are generated.

$$w^{+k}_{i,j} = v^+_{i,j} + \alpha^+_{i,j} x^k_i$$

$$w^{-k}_{i,j} = v^-_{i,j} - \alpha^-_{i,j} x^k_i$$

where $\alpha^+_{i,j}$ and $\alpha^-_{i,j}$ are positive scaling parameters to reduce perceptual noise according to a human visual system.

Each of the subsets $v^+_i$ and $v^-_i$ is, for example, a Discrete Cosine Transform (DCT) block into which a block of the host data V are transformed by DCT. The m samples in which the watermark bits are embedded are DCT coefficients in the DCT block. FIGS. 14A and 14B show how a watermark bit $x^k_i$ is embedded into the m DCT coefficients in a pair of DCT blocks $v^+_i$ and $v^-_i$ of 8×8 samples. The block pair $v^+_i$ and $v^-_i$ and the m DCT coefficients are selected on the basis of the secret key K.

Referring to FIG. 15 again, the correlation evaluator 28 evaluates the robustness of the watermark $x^k$ for each of the L kinds of candidate watermarked host data $W^k$ (S16), and the selector 30 selects one candidate watermarked host data $W^k$ that has the highest degree of robustness as the final watermarked host data W (S18).

As in Embodiment 1, the correlation evaluator 28 evaluates the robustness of the embedded watermark by calculating the correlation coefficient $g_k$ of the true value of the actual embedded watermark $x^k$ and the decision value $z^k$ of the watermark extracted from the candidate watermarked host data Wk, by the following equation.

$$K = \mathrm{argmax}_k g_k(z^k, x^k)$$

$$g_k(z^k, x^k) = (1/n) z^k \cdot x^k = (1/n) \Sigma_{i=0}^{n-1} z^k_i x^k_i,$$

where $z^k = \{z^k_0, z^k_1, \ldots, z^k_{n-1}\}$ and $z^k_i$ is the decision value of the watermark bit $x^k_i$ and $z^k_i = \Sigma_{j=0}^{m-1}(w^{+k}_{i,j} - w^{-k}_{i,j})$.

The following normalized correlation coefficient $g_k$ may be used, depending on circumstances. The normalized correlation coefficient $g_k$ takes a value of −1 to 1.

$$g_k(z^k, x^k) = z^k \cdot x^k / |x^k| \|x^k\|$$

$$\Sigma_{i=0}^{n-1} z^k_i x^k_i / \{(\Sigma_{i=0}^{n-1}|z^k_i|^2)^{1/2} (\Sigma_{i=0n-1}|x^k_i|^2)^{1/2}\}$$

Since the watermark bit $x^k_i$ is 1 or −1, $|x^k_i|^2 = 1$ and the normalized correlation coefficient $g_k$ can be written as follows:

$$g_k(z^k, x^k) = \Sigma_{i=0}^{n-1} z^k_i x^k_i / \{(\Sigma_{i=0}^{n-1}|z^k_i|^2)^{1/2} n^{1/2}\}.$$

In respect of the decision value $z_i$, if $v^+_{i,j} > v^-_{i,j}$ and $x^k_i = 1$, $z_i >> 0$, and if $v^+_{i,j} < v^-_{i,j}$ and $x^k_i = -1$, $z_i << 0$. This means that by selecting the optimal candidate watermark $x^k$ according to the evaluation of the correlation coefficient $g_k$, the original watermark bit $x_i$ is changed to $x_i'$ so that $x_i' = 1$ if $v^+_{i,j} > v^-_{i,j}$ and $x_i' = -1$ if $v^+_{i,j} < v^-_{i,j}$. This is a guiding rule used in the GS method and thereby the response of the decision value $z_i$ is improved.

When the extractor 42 of the digital watermark extracting apparatus 40 receives the noisy watermarked host signal W', the extractor 42 calculates the decision value $z_i$ as follows:

$$z_i = \Sigma_{j=0}^{m-1}(w'^+_{i,j} - w'^-_{i,j})$$

$$= \Sigma_{j=0}^{m-1}[(w^+_{i,j} + n^+_{i,j}) - (w^-_{i,j} + n^-_{i,j})]$$

$$= \Sigma_{j=0}^{m-1}[(v^+_{i,j} - v^-_{i,j}) + (\alpha^+_{i,j} + \alpha^-_{i,j}) x'_i + (n^+_{i,j} - n^-_{i,j})].$$

If the ECC decoder 44 is configured as a hard-input decoder, whether watermark bit x' is −1 or 1 is determined depending on whether the decision value $z_i$ is negative or positive, and the resultant watermark X' is sent to the ECC decoder 44. If the ECC decoder 44 is configured as a soft-input decoder, the decision value $z_i$ is directly sent to the ECC decoder 44 without making any hard decision on whether the watermark bit is −1 or 1.

Furthermore, the extracted watermark X' is decoded by the ECC decoder 44 and descrambled by the descrambler 46 and thereby the original watermark X is obtained.

As stated above, according to this embodiment, when media data such as image or audio to be watermarked are given, the watermark bit sequence can be converted to a bit sequence prone to be adhered to the media data and thereafter embedded. Therefore it is possible to make the digital watermark robust against signal processing, geometric transform, compression, attacks and so on, and thereby the detection accuracy in extracting the watermark is highly improved.

In the above-mentioned embodiment, L multiplexers 20, scramblers 22, ECCs 24, embedders 26, and correlation evaluators 28 are provided in parallel to generate L kinds of candidate watermarks. Alternatively, a single set of these components may be provided and L kinds of candidate watermarks may be sequentially generated and evaluated, and thereby an optimal candidate may be selected.

Although the present invention has been described by way of exemplary embodiments, it should be understood that many changes and substitutions may be made by those skilled in the art without departing from the scope of the present invention which is defined by the appended claims. Some such alterations are stated as follows.

In the above-mentioned embodiment, the candidate watermark locations are randomly generated by a look-up table. Alternatively, any other methods for randomly generating the watermark locations may be adopted. For instance, the location information generator 60 may generate a plurality of candidate watermark locations by randomly interleaving the sequence of the samples to be watermarked.

The GS-based method is used for generating a plurality of candidate watermarks, in which a variety of candidates can be generated, however, the other scrambling methods are also applicable and the candidates may be randomly generated by some methods. In the embodiments, the original watermark is restored by descrambling the scrambled watermark. Alternatively, a table that associates the scrambled watermark with the original watermark may be provided and the original watermark may be obtained by referring to the table.

What is claimed is:

1. A digital watermark extracting apparatus comprising:
a location information generating unit which generates a plurality of candidate locations of host data in which a digital watermark is supposed to have been embedded;
an extracting unit which extracts a plurality of candidate watermarks embedded in the host data according to the respective candidate locations;
a decision value evaluating unit which evaluates significance of a decision value on each of the plurality of the extracted candidate watermarks; and
a selecting unit which determines that one of the plurality of the candidate locations is a true watermark location according to an evaluation result of the significance of the decision value, and selects and outputs a watermark extracted from the true watermark location, wherein
the decision value evaluating unit evaluates the significance according to a soft decision value on each bit of the respective extracted candidate watermarks, and the selecting unit determines that one candidate location which is evaluated to be most significant according to the soft decision value is the true watermark location, and
the selecting unit determines that there is no watermark embedded in any candidate locations, if the evaluated significance does not have any difference larger than a predefined threshold between one candidate location which is evaluated to be most significant and another candidate location which is evaluated to be next most significant.

2. A digital watermark extracting apparatus comprising:
a location information generating unit which generates a plurality of candidate locations of host data in which a digital watermark is supposed to have been embedded;
an extracting unit which extracts a plurality of candidate watermarks embedded in the host data according to the respective candidate locations;
a decision value evaluating unit which evaluates significance of a decision value on each of the plurality of the extracted candidate watermarks; and
a selecting unit which determines that one of the plurality of the candidate locations is a true watermark location according to an evaluation result of the significance of the decision value, and selects and outputs a watermark extracted from the true watermark location, wherein
the decision value evaluating unit evaluates the significance by calculating a sum of absolute soft decision values on bits of the respective extracted candidate watermarks, and the selecting unit determines that one candidate location with the largest sum of the absolute soft decision values is the true watermark location.

3. A digital watermark extracting apparatus comprising:
a location information generating unit which generates a plurality of candidate locations of host data in which a digital watermark is supposed to have been embedded;
an extracting unit which extracts a plurality of candidate watermarks embedded in the host data according to the respective candidate locations;
a decision value evaluating unit which evaluates significance of a decision value on each of the plurality of the extracted candidate watermarks; and
a selecting unit which detennines that one of the plurality of the candidate locations is a true watermark location according to an evaluation result of the significance of the decision value, and selects and outputs a watermark extracted from the true watermark location, wherein
the decision value evaluating unit evaluates the significance by calculating a sum of absolute soft decision values on bits of the respective extracted candidate watermarks, and the selecting unit determines that one candidate location with the largest sum of the absolute soft decision values is the true watermark location, and
the selecting unit determines that there is no watermark embedded in any candidate locations, if a difference between the largest and the second largest sums of the absolute soft decision values is smaller than a predefined threshold.

* * * * *